(12) United States Patent
Zhao et al.

(10) Patent No.: US 12,384,364 B2
(45) Date of Patent: Aug. 12, 2025

(54) LANE BIAS MANEUVER FOR AUTONOMOUS VEHICLES TO NEGOTIATE A CURVED ROAD

(71) Applicant: TuSimple, Inc., San Diego, CA (US)

(72) Inventors: Yufei Zhao, San Diego, CA (US); Tianqu Shao, San Diego, CA (US); Yujia Wu, San Diego, CA (US); Lei Wang, San Diego, CA (US); Haoming Sun, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 362 days.

(21) Appl. No.: 18/048,890

(22) Filed: Oct. 24, 2022

(65) Prior Publication Data
US 2023/0136434 A1 May 4, 2023

Related U.S. Application Data

(60) Provisional application No. 63/263,289, filed on Oct. 29, 2021, provisional application No. 63/263,303, filed on Oct. 29, 2021.

(51) Int. Cl.
*B60W 30/095* (2012.01)
*B60W 30/18* (2012.01)
(Continued)

(52) U.S. Cl.
CPC .. *B60W 30/0956* (2013.01); *B60W 30/18163* (2013.01); *B60W 40/04* (2013.01);
(Continued)

(58) Field of Classification Search
CPC ........... B60W 30/18163; B60W 40/04; B60W 40/072; B60W 60/0015; B60W 2300/145;
(Continued)

(56) References Cited

U.S. PATENT DOCUMENTS

2012/0166032 A1 6/2012 Lee
2017/0247032 A1* 8/2017 Lee .................. B60W 30/12
(Continued)

FOREIGN PATENT DOCUMENTS

DE 102020005012 A1 * 12/2020
EP 3889722 A1 2/2020

OTHER PUBLICATIONS

PCT-US2022-078619, PCT Notification of Transmittal of the International Search Report and the Written Opinion of the International Searching Authority, or the Declaration mailed Apr. 13, 2023.
(Continued)

*Primary Examiner* — Peter D Nolan
*Assistant Examiner* — Anwar Mohamed
(74) *Attorney, Agent, or Firm* — Perkins Coie LLP

(57) ABSTRACT

A system for implementing a lane bias maneuver to negotiate a curved road comprises an autonomous vehicle and a control device. The control device determines that the autonomous vehicle is approaching a curved road. The control device determines a road radius of the curved road. The control device calculates a first lane bias adjustment amount associated with a road curvature of the curved road based on the road radius. The control device calculates a second lane bias adjustment amount associated with a trailer angle between a trailer and a semi-truck tractor unit of the autonomous vehicle. The control device calculates a total lane bias adjustment amount by combining the first and second lane bias adjustment amounts. The control device instructs the autonomous vehicle to perform a lane bias maneuver that comprises driving the autonomous vehicle off-center in a curved lane based on the total lane bias adjustment amount.

19 Claims, 7 Drawing Sheets

(51) Int. Cl.
*B60W 40/04* (2006.01)
*B60W 40/072* (2012.01)
*B60W 60/00* (2020.01)

(52) U.S. Cl.
CPC ...... *B60W 40/072* (2013.01); *B60W 60/0015* (2020.02); *B60W 2300/145* (2013.01); *B60W 2420/403* (2013.01); *B60W 2420/408* (2024.01); *B60W 2520/06* (2013.01); *B60W 2520/10* (2013.01); *B60W 2520/22* (2013.01); *B60W 2552/30* (2020.02); *B60W 2552/53* (2020.02); *B60W 2554/4041* (2020.02); *B60W 2554/4042* (2020.02); *B60W 2554/4044* (2020.02); *B60W 2554/4046* (2020.02); *B60W 2554/801* (2020.02); *B60W 2554/802* (2020.02); *B60W 2556/10* (2020.02); *B60W 2556/40* (2020.02); *B60W 2720/10* (2013.01)

(58) Field of Classification Search
CPC ......... B60W 2520/22; B60W 2552/30; B60W 2552/53; B60W 2556/40; B60W 2300/14
See application file for complete search history.

(56) References Cited

U.S. PATENT DOCUMENTS

| | | | |
|---|---|---|---|
| 2017/0247054 A1* | 8/2017 | Lee | B62D 15/029 |
| 2020/0101981 A1 | 4/2020 | Phillips | |
| 2020/0207353 A1 | 7/2020 | Chen | |
| 2020/0342760 A1 | 10/2020 | Vassilovski | |
| 2022/0299626 A1* | 9/2022 | Chen | G01S 7/412 |
| 2023/0012853 A1 | 1/2023 | Tam | |
| 2023/0217195 A1 | 7/2023 | Poltorak | |

OTHER PUBLICATIONS

PCT Invitation to Pay Additional Fees and, where applicable, Protest Fee; Intl. Appln. PCT/US2022/078619, mailed Feb. 21, 2023.

* cited by examiner

LANE BIAS MANEUVER FOR AUTONOMOUS VEHICLES TO NEGOTIATE A CURVED ROAD

PRIORITY

The application claims priority to U.S. Provisional Application No. 63/263,289 filed Oct. 29, 2021, and titled "Lane Bias Maneuver for Autonomous Vehicles to Avoid an Intruding Vehicle," and U.S. Provisional Application No. 63/263,303 filed Oct. 29, 2021, and titled "Lane Bias Maneuver for Autonomous Vehicles to Negotiate a Curved Road," which are incorporated herein by reference.

TECHNICAL FIELD

The present disclosure relates generally to autonomous vehicles. More particularly, the present disclosure is related to lane bias maneuver for autonomous vehicles to negotiate a curved road.

BACKGROUND

One aim of autonomous vehicle technologies is to provide vehicles that can safely navigate towards a destination. It is inevitable that an autonomous vehicle encounters other vehicles while traveling on a road. An autonomous vehicle may sometimes drive on straight roads and sometimes on curved roads.

SUMMARY

This disclosure recognizes various problems and previously unmet needs related to implementing safe navigation for autonomous vehicle in situations where the autonomous vehicle encounters an intruding, invading, or oversized vehicle or when the autonomous vehicle approaches a curved road. Certain embodiments of this disclosure provide unique technical solutions to technical problems of current autonomous vehicle technologies, including those problems described above to: 1) implement a lane bias maneuver to avoid intruding, invading, or oversized vehicles; and 2) implement a lane bias maneuver to negotiate a curved road.

Implementing a Lane Bias Maneuver to Avoid a Vehicle

This disclosure contemplates systems and methods for implementing a lane bias maneuver to avoid a vehicle. While traveling on a road, the autonomous vehicle may encounter an invading, intruding, or oversized vehicle in an adjacent lane. The lane bias maneuver may enable the autonomous vehicle to drive off-center in its current lane to avoid the encountered vehicle and to keep a safe distance (e.g., more than a predefined threshold distance) from the encountered vehicle. In other words, the lane bias maneuver may enable the autonomous vehicle to drive off-center in its current lane without changing to another lane.

In some cases, changing to another lane may not be a safe maneuver because of traffic on the road. In other cases, the autonomous vehicle may need to stay on its current lane to perform the next navigation maneuver on its predefined routing plan, such as take a particular exit, take a particular turn, etc. In such cases, changing to another lane may not be a practical solution for the autonomous vehicle.

Thus, the disclosed system in this disclosure is integrated into a practical application of improving the navigation of the autonomous vehicles by implementing the lane bias maneuver in cases where the autonomous vehicle encounters an invading, intruding, or oversized vehicle in the adjacent lane.

The invading vehicle in the adjacent lane may be classified as a vehicle that is constantly driving in close proximity from the autonomous vehicle, for example, closer than a threshold distance defined by a control device of the autonomous vehicle, such as six feet, seven feet, etc.

The intruding vehicle in the adjacent lane may be classified as a vehicle that temporarily or suddenly drives too close to the autonomous vehicle, e.g., closer than the threshold distance from the autonomous vehicle. The oversized vehicle in the adjacent lane may be classified as a vehicle that is taking more space in the adjacent lane due to its size, and as a result, a distance between the oversized vehicle and the autonomous vehicle is less than the threshold distance. Each of the invading, intruding, and oversized vehicles may generally be referred to herein as a vehicle or encountered vehicle.

In any case of encountering such vehicles in the adjacent lane from the autonomous vehicle, the control device of the autonomous vehicle may determine that a lateral distance between the autonomous vehicle and each vehicle is less than the threshold distance.

In some cases, the control device of the autonomous vehicle may determine that the vehicle in the adjacent lane from the autonomous vehicle has crossed over a lane marker between the autonomous vehicle and the vehicle. In some cases, the control device of the autonomous vehicle may determine that the vehicle in the adjacent lane has not crossed over the lane marker, but is driving within the threshold distance from the autonomous vehicle. In other cases, the control device of the autonomous vehicle may determine that a vehicle has previously crossed over one or more lane markers on the road based on historical driving behaviors or patterns of the vehicle. In other cases, the control device of the autonomous vehicle may determine that the vehicle is in an emergency lane, either parked or in transit.

The vehicle may be detected on either side of the autonomous vehicle, or on either side and in front of the autonomous vehicle. The vehicle may be in transit or stationary. For example, the control device of the autonomous vehicle may determine that the vehicle is driving on either side of the autonomous vehicle in the adjacent lane. In another example, the control device of the autonomous vehicle may determine that the vehicle is driving on either side of the autonomous vehicle in the adjacent lane and in front of the autonomous vehicle. In another example, the control device of the autonomous vehicle may determine that the vehicle is stopped (or stalled) on a side of the road in front of the autonomous vehicle, for example, in a case where the vehicle is stopped on a side of the road to change its tire.

In any of these cases, the control device of the autonomous vehicle may determine whether to instruct the autonomous vehicle to perform the lane bias maneuver. The lane bias maneuver may enable the autonomous vehicle to drive off-center in its current lane toward the opposite direction with respect to the vehicle until the lateral distance between the vehicle and the autonomous vehicle is at least equal to the threshold distance. In other words, the autonomous vehicle biases toward the other side of the current lane. In some embodiments, the autonomous vehicle may perform the lane bias maneuver until the autonomous vehicle and the vehicle are no longer adjacent to each other, for example, until either the autonomous vehicle passes by the vehicle or the vehicle passes by the autonomous vehicle. In one example, the autonomous vehicle may perform the lane bias maneuver until it is determined that no portion of the autonomous vehicle overlaps with any portion of the vehicle that is traveling in an adjacent lane. In another example, the autonomous vehicle may perform the lane bias maneuver until it is determined that less than a threshold portion of the vehicle that is traveling in an adjacent lane overlaps with any portion of the autonomous vehicle. The threshold portion of the vehicle may be one-third, half, two-third, or any other suitable portion of a length of the vehicle.

If the control device of the autonomous vehicle determines that the lateral distance between the autonomous vehicle and the vehicle is less than the threshold distance, the control device may determine whether performing the lane bias maneuver is executable and safe.

In this process, the control device of the autonomous vehicle may determine that performing the lane bias maneuver is executable if it is determined that the lane bias maneuver can be performed within a threshold time period, e.g., two minutes, five minutes, or any other suitable time period, depending on the traffic on the road. For example, if there is congested traffic on the road, the control device may determine that the lane bias maneuver cannot be performed within the threshold time period.

The control device may determine that the lane bias maneuver is executable if it is determined that there is enough room or distance on the other side of the autonomous vehicle on its current lane to perform the lane bias maneuver.

In some embodiments, if the control device may determine that there is not enough distance on the other side of the autonomous vehicle to perform the lane bias maneuver, the control device may temporarily cross over into an adjacent lane on the other side of the autonomous vehicle (compared to where the vehicle is detected) and take as much space of the adjacent lane (if traffic in the adjacent lane allows) until the lateral distance between the autonomous vehicle and the encountered vehicle is equal to the threshold distance.

The control device of the autonomous vehicle may determine that performing the lane bias maneuver is executable based on the road structure. For example, if the road has a high curvature (e.g., more than fifty degrees, sixty degrees, etc.), the control device may determine that performing the lane bias maneuver is not executable.

The control device may determine that the lane bias maneuver is safe based on the historical driving behavior of the encountered vehicle. For example, if the historical driving behavior of the encountered vehicle indicates that the driving pattern of the vehicle is highly unpredictable (e.g., the driving pattern or trajectory prediction of the vehicle is less than a threshold percentage, such as 70%, 65%, etc.), the control device may determine that the lane bias maneuver is not safe.

If the control device determines that the lane bias maneuver is not executable and/or safe, the control device may instruct the autonomous vehicle to perform a minimal risk maneuver. The minimal risk maneuver may include slowing down the autonomous vehicle or speeding up the autonomous vehicle until the autonomous vehicle and the vehicle are not adjacent to each other.

In some embodiments, a system may comprise an autonomous vehicle and a control device. The autonomous vehicle is configured to travel along a road. The autonomous vehicle comprises at least one sensor configured to capture sensor data associated with one or more objects on the road. The control device is associated with the autonomous vehicle. The control device comprises a processor. The processor may detect a presence of a vehicle from the sensor data. The processor may determine a lateral distance between the autonomous vehicle and the vehicle. The processor may compare the lateral distance between the autonomous vehicle and the vehicle with a threshold distance from the autonomous vehicle. The processor may determine whether to instruct the autonomous vehicle to perform a lane bias maneuver based at least in part upon the comparison between the lateral distance and the threshold distance. The lane bias maneuver comprises driving the autonomous vehicle off-center in a current lane traveled by the autonomous vehicle toward an opposite direction with respect to the vehicle until the lateral distance between the autonomous vehicle and the vehicle is at least equal to the threshold distance.

Accordingly, the disclosed systems provide several practical applications and technical advantages, which include: 1) technology that improves the navigation of the autonomous vehicle by enabling the autonomous vehicle to drive off-center on its current lane to avoid intruding, invading, or oversized vehicles in the adjacent lane; and 2) technology that determines a lane bias distance that the autonomous vehicle drives off-center in its current lane so that a distance between the autonomous vehicle and the encountered vehicle is equal to a predetermined threshold distance.

Implementing a Lane Bias Maneuver Based on a Road Curvature and Trailer Angle

This disclosure further contemplates systems and methods for implementing a lane bias maneuver for autonomous vehicles based on a road curvature and trailer angle. For example, the autonomous vehicle may be a semi-truck tractor unit attached with a trailer. While traveling on a curved road, a trailer of the autonomous vehicle may divert from the straight line due to a road curvature. In other words, the trailer of the autonomous vehicle may swing to left or right depending on the direction of the road curvature. Likewise, while traveling on a straight road, wind going across the autonomous vehicle may cause the trailer of the autonomous vehicle to swing or divert from the straight line. This may create a trailer angle between the trailer of the autonomous vehicle and a semi-truck tractor unit of the autonomous vehicle. In such cases, the disclosed system may instruct the autonomous vehicle to perform a lane bias maneuver to compensate for the diversion of the trailer of the autonomous vehicle from the straight line.

The disclosed system calculates a first lane bias adjustment distance amount associated with the road curvature and a second lane bias adjustment distance amount associated with the trailer angle. The disclosed system calculates a total lane bias adjustment distance amount by combining the first and second lane bias adjustment distance amounts. The total lane bias adjustment distance amount is a distance that the autonomous vehicle drives off-center in the current lane to compensate for the diversion of the trailer of the autonomous vehicle from the straight line. The disclosed system may instruct the autonomous vehicle to bias toward the right or left direction (while in the current lane) based on the total lane bias adjustment distance amount.

According to an embodiment, a system comprises an autonomous vehicle and a control device. The autonomous vehicle is configured to travel along a road. The autonomous vehicle is a semi-truck tractor unit attached with a trailer. The control device is associated with the autonomous vehicle. The control device comprises a memory and a processor. The memory is configured to store map data that comprises one or more roads ahead of the autonomous vehicle. The processor is operably coupled with the memory.

The processor may determine that the autonomous vehicle is approaching a curved road based at least in part upon the map data. The processor may determine a road radius of the curved road from the map data. The processor may calculate a first lane bias adjustment amount associated with a road curvature of the curved road based at least in part upon the road radius. The processor may determine a trailer angle between the trailer and the semi-truck tractor unit. The processor may calculate a second lane bias adjustment amount associated with the trailer angle based at least in part upon the trailer angle. The processor may calculate a total lane bias adjustment amount by combining the first lane bias adjustment amount and the second lane bias adjustment amount. The processor may instruct the autonomous vehicle to perform a lane bias maneuver, wherein the lane bias maneuver comprises driving the autonomous vehicle off-center in a curved lane currently traveled by the autonomous vehicle based at least in part upon the total lane bias adjustment amount.

Accordingly, the disclosed systems provide several practical applications and technical advantages, which include: 1) technology that improves operating an autonomous vehicle's safety, such as with respect to surrounding vehicles; 2) technology that improves the navigation of the autonomous vehicle in curved roads by enabling the autonomous vehicle to drive off-center in its current lane to compensate for the diversion of the trailer of the autonomous vehicle from the straight line; and 3) technology that determines the total lane bias adjustment distance that the autonomous vehicle drives off-center in its current lane so that neither the semi-truck tractor unit nor the trailer of the autonomous vehicle invades side lanes.

As such, the systems described in this disclosure may be integrated into practical applications of determining a more efficient, safe, and reliable navigation solution for autonomous vehicles as well as other vehicles on the same road as the autonomous vehicle.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In some cases, while an autonomous vehicle is traveling along a road, a vehicle may drive too close to the autonomous vehicle and invade a lane that the autonomous vehicle is in. In some cases, a trailer of the autonomous vehicle may swing to left or right depending on the direction of the road. Such cases may lead to unsafe driving conditions for the autonomous vehicle and other vehicles.

Figure 1:
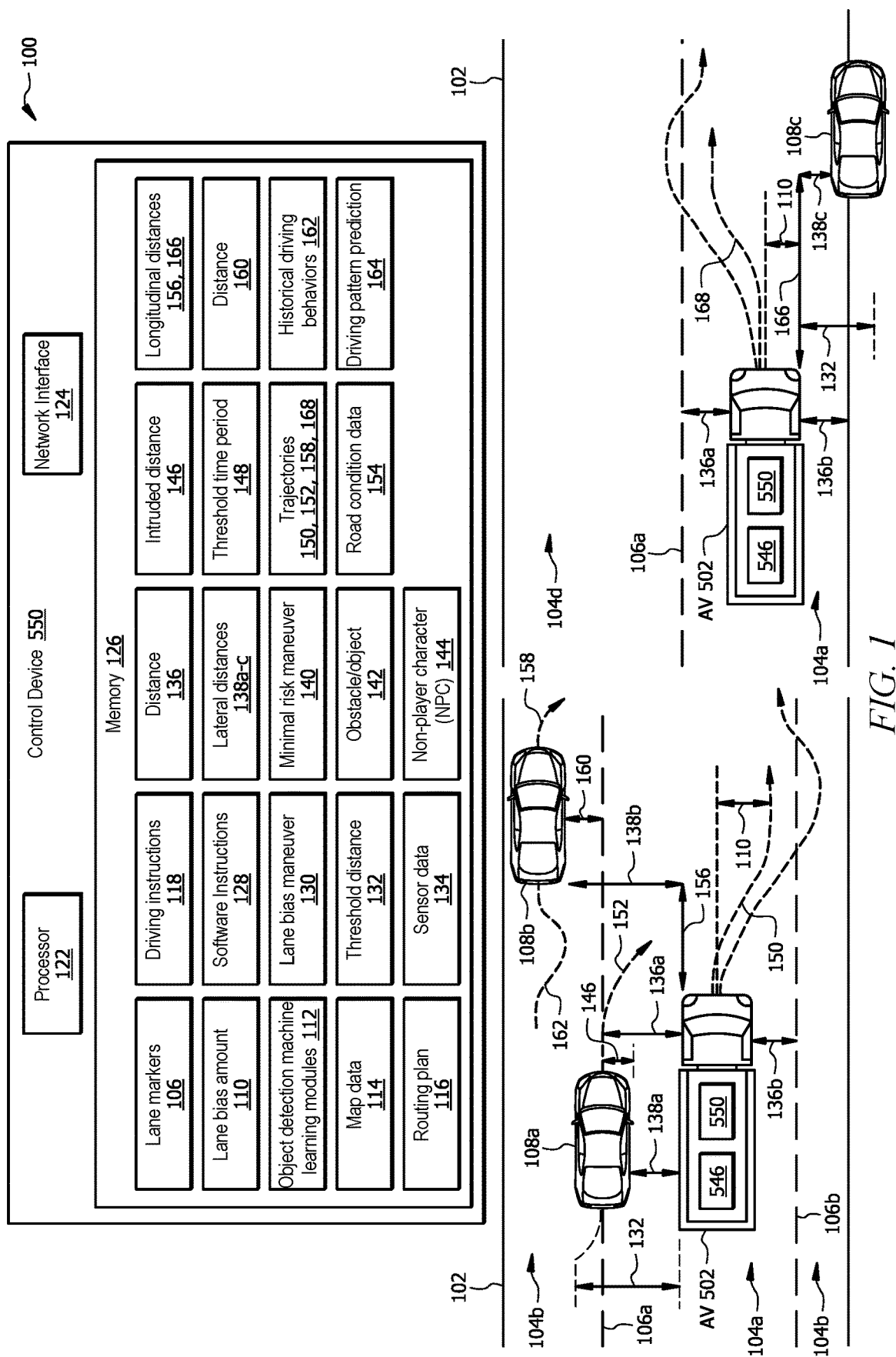
FIG. 1 illustrates an embodiment of a system configured to implement a lane bias maneuver to avoid a vehicle.
Figure 2:
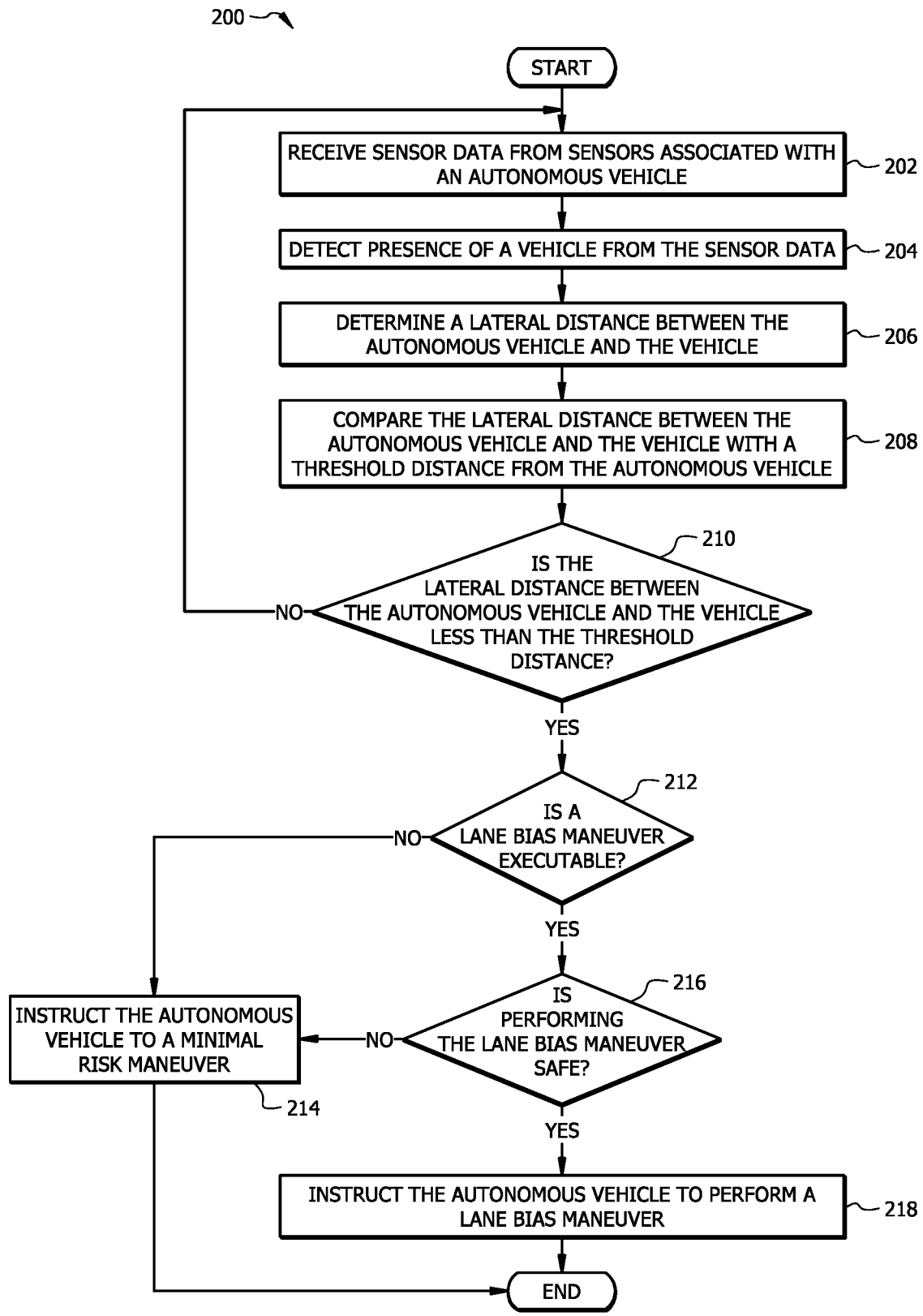
FIG. 2 illustrates an example flowchart of a method for implementing a lane bias maneuver to avoid a vehicle.
Figure 3:
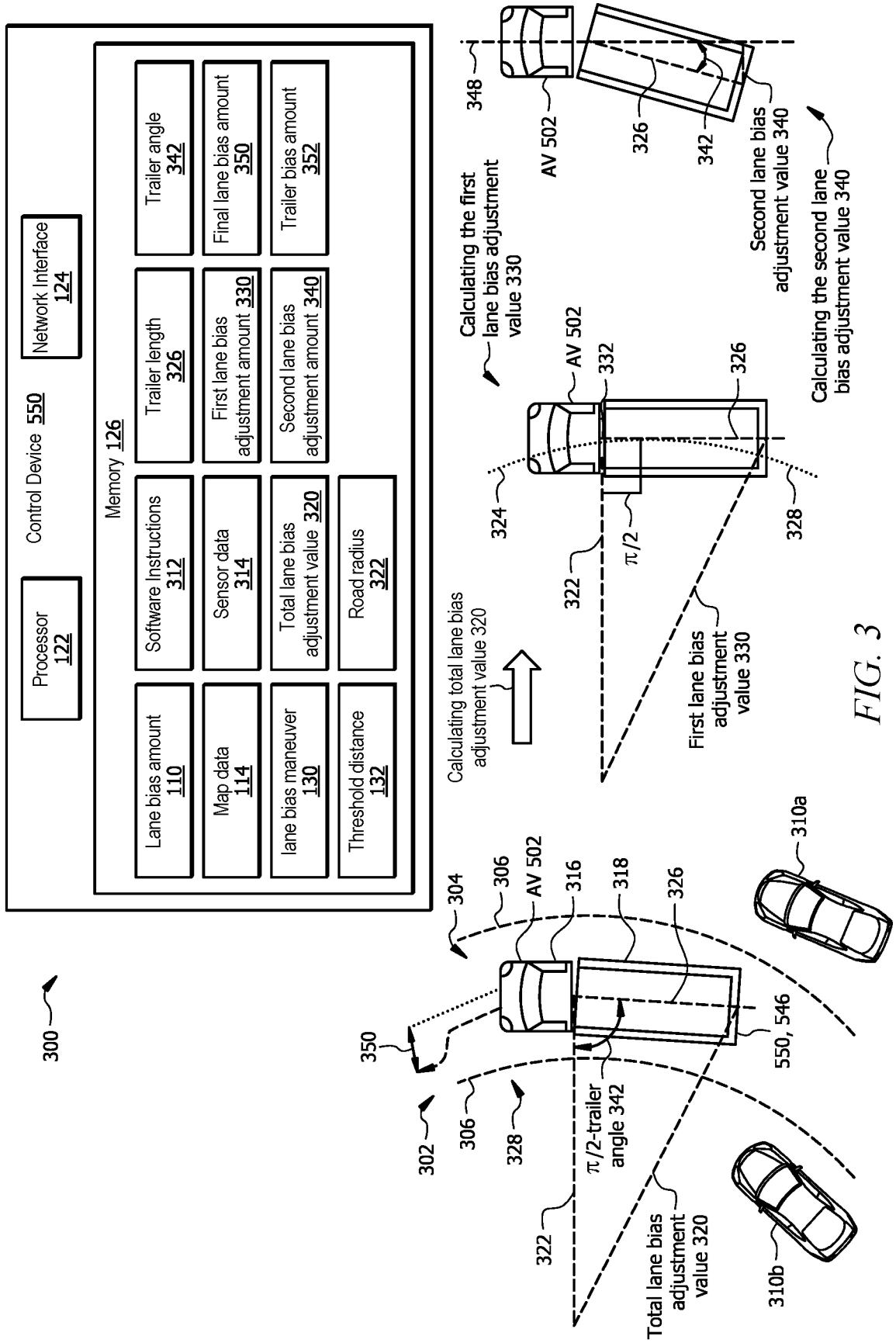
FIG. 3 illustrates an embodiment of a system configured to implement a lane bias maneuver to negotiate a curved road.
Figure 4:
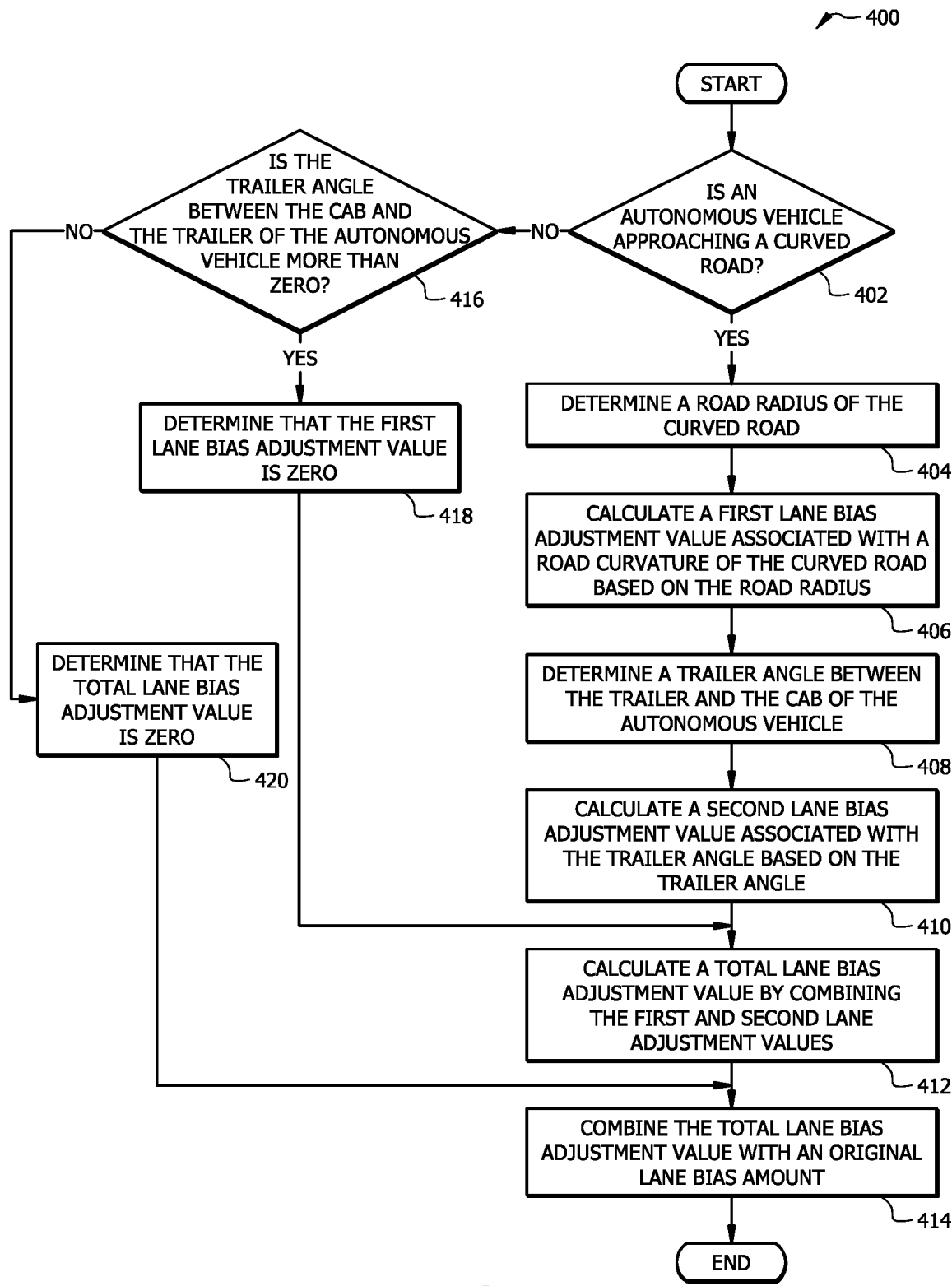
FIG. 4 illustrates an example flowchart of a method for implementing a lane bias maneuver to negotiate a curved road.
Figure 5:
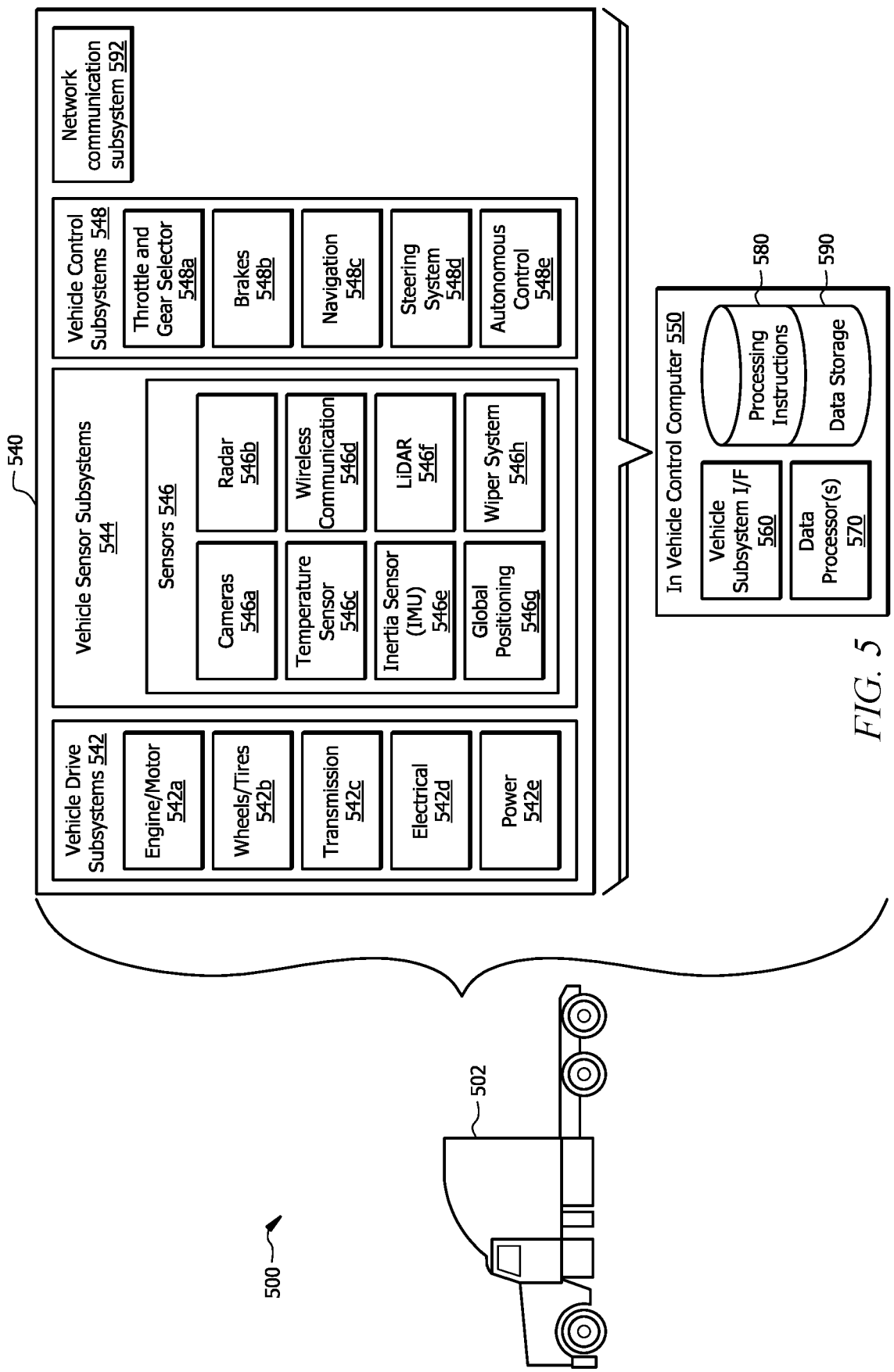
FIG. 5 illustrates a block diagram of an example autonomous vehicle configured to implement autonomous driving operations.
Figure 6:
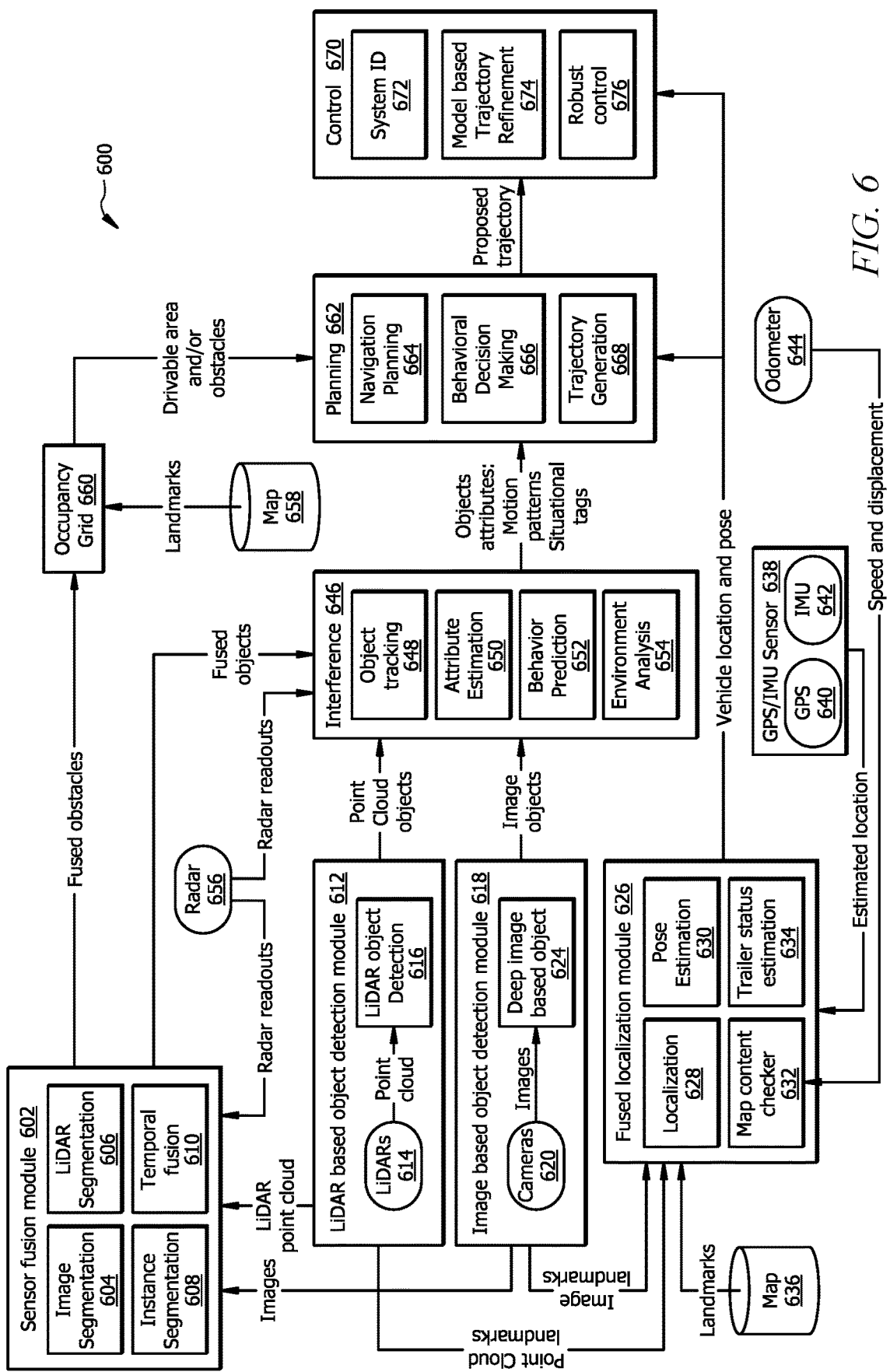
FIG. 6 illustrates an example system for providing autonomous driving operations used by the autonomous vehicle of FIG. 5.
Figure 7:
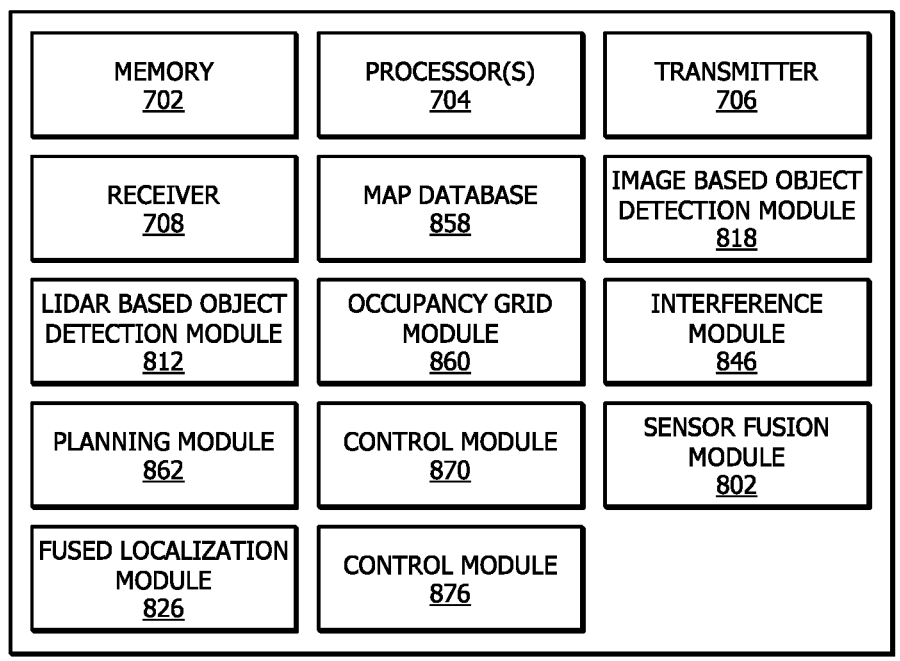
FIG. 7 illustrates a block diagram of an in-vehicle control computer included in the autonomous vehicle of FIG. 5.

As described above, previous technologies fail to provide efficient, reliable, and safe navigation solutions for an autonomous vehicle in situations where the autonomous vehicle encounters an intruding, invading, or oversized vehicle or when the autonomous vehicle approaches a curved road. This disclosure provides various systems, methods, and devices to: 1) implement a lane bias maneuver to avoid intruding, invading, or oversized vehicles; 2) implement a lane bias maneuver to negotiate a curved road; and 3) providing a safe driving experience for autonomous vehicles, other vehicles, and pedestrians. FIG. 1 illustrates an embodiment of a system 100 for implementing a lane bias maneuver to avoid a vehicle. FIG. 2 illustrates an embodiment of a method 200 for implementing a lane bias maneuver to avoid a vehicle. FIG. 3 illustrates an embodiment of a system 300 for implementing a lane bias maneuver to negotiate a curved road. FIG. 4 illustrates an embodiment of a method 400 for implementing a lane bias maneuver to negotiate a curved road. FIGS. 5-7 illustrate an example autonomous vehicle and its various systems and devices for implementing autonomous driving operations by the autonomous vehicle.

Example System for Implementing a Lane Bias Maneuver for Autonomous Vehicles

FIG. 1 illustrates an embodiment of a system 100 for implementing a lane bias maneuver 130 for an autonomous vehicle 502. FIG. 1 further illustrates a simplified schematic diagram of a road 102 traveled by an autonomous vehicle 502. In some embodiments, system 100 comprises an autonomous vehicle 502 and its components, including a control device 550 and sensors 546.

The control device 550 comprises a processor 122 in signal communication with a memory 126. Memory 126 may store software instructions 128 that when executed by the processor 122 cause the control device 550 to perform one or more functions described herein. For example, when the software instructions 128 are executed, the processor 122 may instruct the autonomous vehicle 502 to implement a lane bias maneuver 130, such that the autonomous vehicle 502 may drive off-center in its current lane to keep a safe distance from one or more surrounding vehicles 108. The system 100 may be configured as shown or in any other suitable configuration.

In general, system 100 may be configured to implement a lane bias maneuver 130 in response to detecting that: 1) a vehicle 108 is intruding the current lane 104a traveled by the autonomous vehicle 502; 2) a distance between a vehicle 108 and a lane marker 106 between the autonomous vehicle 502 and the vehicle 108 is less than a threshold distance 132; and/or 3) historical driving behavior 162 associated with a vehicle 108 indicates that the vehicle 108 has intruded or invaded one or more lanes 104 (in one or more instances).

While driving along a road 102, the autonomous vehicle 502 may face an intruding, invading, or oversized vehicle 108 on an adjacent lane 104. There may be a situation where a distance between the autonomous vehicle 502 and such a vehicle 108 may become less than a threshold distance 132. For example, an intruding or invading vehicle 108 may drive too close to the lane marker 106a between the autonomous vehicle 502 and the vehicle 108 (e.g., pass the threshold distance 132) or even cross over the lane marker 106a. In another example, the distance between an oversized vehicle 108 and the autonomous vehicle 502 may become less than the threshold distance 132 due to the larger space that the oversized vehicle 108 occupies.

In such cases, diverting to another lane 104 may not be safe or executable. For example, the autonomous vehicle 502 may be at a side lane 104a on the road 102, and there may not be another lane 104 to divert to. In another example, there may be traffic in the adjacent lane 104. In another example, the autonomous vehicle 502 may need to stay on the current lane 104a to follow its navigation or routing plan 116 to reach its destination.

In such cases, a safer driving maneuver may be to perform the lane bias maneuver 130. The lane bias maneuver 130 may enable the autonomous vehicle 502 to drive off-center in the current lane 104a traveled by the autonomous vehicle 502 toward the opposite direction with respect to the vehicle 108 until the lateral distance 138 between the vehicle 108 and the autonomous vehicle 502 is at least equal to the threshold distance 132. In other words, the autonomous vehicle 502 biases toward the other side of the current lane 104a (away from the vehicle 108) until the lateral distance 138 between the vehicle 108 and the autonomous vehicle 502 is at least equal to the threshold distance 132. In some embodiments, the autonomous vehicle 502 may perform the lane bias maneuver 130 until the autonomous vehicle 502 and the vehicle 108 are no longer adjacent to each other, for example, until either the autonomous vehicle 502 passes by the vehicle 108 or the vehicle 108 passes by the autonomous vehicle 502. In one example, the autonomous vehicle 502 may perform the lane bias maneuver 130 until it is determined that no portion of the autonomous vehicle 502 overlaps with any portion of the vehicle 108 that is traveling in an adjacent lane 104. In another example, the autonomous vehicle 502 may perform the lane bias maneuver 130 until it is determined that less than a threshold portion of the vehicle 108 that is traveling in an adjacent lane 104 overlaps with any portion of the autonomous vehicle 502. The threshold portion of the vehicle 108 may be one-third, half, two-third, or any other suitable portion of a length of the vehicle 108.

System 100 may be further configured to perform a minimal risk maneuver 140 if it is determined that the lane bias maneuver 130 is not executable or that it is not safe to perform the lane bias maneuver 130. The minimal risk maneuver 140 may include slowing down the autonomous vehicle 502, speeding up the autonomous vehicle 502, among others until the autonomous vehicle 502 and the vehicle 108 are not adjacent to each other.

Various use cases where the autonomous vehicle 502 encounters a situation that may lead to performing the lane bias maneuver 130 are described further below in conjunction with the operational flow of the system 100. In the example use cases described in FIG. 1, the autonomous vehicle 502 encounters intruding, invading, and oversized vehicles 108. However, the example use cases described in FIG. 1 are not meant to limit the scope of this disclosure. One of ordinary skill in the art would recognize other use cases and embodiments in light of the present disclosure. In some examples, the autonomous vehicle 502 may encounter an obstacle or object 142 obstructing at least a portion of the road 102 including, a construction zone, a pedestrian on a side of the road 102, an emergency vehicle 108 parked or in transit on an emergency lane, and a person standing on a side of a lane 104 attending to their vehicle 108. In any of these examples and the use cases of encountering intruding, invading, and oversized vehicles 108, system 100 may treat each of these as a non-player character 144 that may lead to performing the lane bias maneuver 130 to avoid each of these non-player characters 144. A non-player character 144 may be any object 142 that the autonomous vehicle 502 interacts with.

System Components

In some embodiments, the autonomous vehicle 502 may include a semi-truck tractor unit attached to a trailer to transport cargo or freight from one location to another location (see FIG. 5). The autonomous vehicle 502 may be generally configured to travel along a road 102 in an autonomous mode. The autonomous vehicle 502 may be navigated using a plurality of components described in detail in FIGS. 5-7. The operation of the autonomous vehicle 502 is described in greater detail in FIGS. 5-7. The corresponding description below includes brief descriptions of certain components of the autonomous vehicle 502.

Control device 550 may be generally configured to control the operation of the autonomous vehicle 502 and its components, and facilitate autonomous driving of the autonomous vehicle 502. The control device 550 may be further configured to determine a pathway in front of the autonomous vehicle 502 that is safe to travel and free of objects/obstacles, and navigate the autonomous vehicle 502 to travel in that pathway. This process is described in more detail in FIGS. 5-7. The control device 550 may generally include one or more data processors in signal communication with subsystem components of the autonomous vehicle 502 (see FIG. 5).

The control device 550 may be configured to detect objects on and around road 102 by analyzing the sensor data 134 and/or map data 114. For example, the control device 550 may detect objects on and around road 102 by implementing object detection machine learning modules 112. The object detection machine learning module 112 may be implemented using neural networks and/or machine learning algorithms for detecting objects from images, videos, infrared images, point clouds, radar data, etc. The object detection machine learning module 112 is described in more detail further below. The control device 550 may receive sensor data 134 from the sensors 546 positioned on the autonomous vehicle 502 to determine a safe pathway to travel. The sensor data 134 may include data captured by the sensors 546.

Sensors 546 may be configured to capture any object within their detection zones or fields of view, such as landmarks, lane markers, lane boundaries, road boundaries, vehicles 108, pedestrians, road/traffic signs, among others. The sensors 546 may include cameras, LiDAR sensors, motion sensors, infrared sensors, and the like. In some embodiments, the sensors 546 may be positioned around the autonomous vehicle 502 to capture the environment surrounding the autonomous vehicle 502. See the corresponding description of FIG. 5 for further description of the sensors 546.

Control Device

The control device 550 is described in detail in FIG. 5. In brief, the control device 550 may include a processor 122 in signal communication with a memory 126 and a network interface 124. The processor 122 may include one or more processing units that perform various functions as described herein. The memory 126 may store any data and/or instructions used by the processor 122 to perform its functions. For example, the memory 126 may store software instructions 128 that when executed by the processor 122 causes the control device 550 to perform one or more functions described herein.

The processor 122 may be one of the data processor 570 described in FIG. 5. The processor 122 comprises one or more processors operably coupled to the memory 126. The processor 122 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 124 and memory 126. The one or more processors may be configured to process data and may be implemented in hardware or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-7. In some embodiments, the function described herein is implemented using logic units, FPGAs, ASICs, DSPs, or any other suitable hardware or electronic circuitry.

The network interface 124 may be a component of the network communication subsystem 592 described in FIG. 5. The network interface 124 may be configured to enable wired and/or wireless communications. The network interface 124 may be configured to communicate data between the control device 550 and other network devices, systems, or domain(s). For example, the network interface 124 may comprise a WIFI interface, a local area network (LAN) interface, a wide area network (WAN) interface, a modem, a switch, or a router. The processor 122 may be configured to send and receive data using the network interface 124. The network interface 124 may be configured to use any suitable type of communication protocol.

The memory 126 may be one of the data storages 590 described in FIG. 5. The memory 126 may store any of the information described in FIGS. 1-7 along with any other data, instructions, logic, rules, or code operable to implement the function(s) described herein when executed by processor 122. For example, the memory 126 may store software instructions 128, lane bias maneuver 130, minimal risk maneuver 140, location of lane markers 106, threshold distance 132, sensor data 134, lateral distances 138a-c, distance 136, intruded distance 146, threshold time period 148, trajectories 150, 152, 158, and 168, road condition data 154, longitudinal distances 156 and 166, distance 160, historical driving behaviors 162, obstacle/object 142, non-player character 144, driving pattern predictions 164, lane bias amount 110, object detection machine learning modules 112, map data 114, routing plan 116, driving instructions 118, and/or any other data/instructions. The software instructions 128 include code that when executed by the processor 122 causes the control device 550 to perform the functions described herein, such as some or all of those described in FIGS. 1-7. The memory 126 comprises one or more disks, tape drives, or solid-state drives, and may be used as an over-flow data storage device, to store programs when such programs are selected for execution, and to store instructions and data that are read during program execution. The memory 126 may be volatile or non-volatile and may comprise read-only memory (ROM), random-access memory (RAM), ternary content-addressable memory (TCAM), dynamic random-access memory (DRAM), and static random-access memory (SRAM). The memory 126 may include one or more of a local database, cloud database, network-attached storage (NAS), etc.

Object detection machine learning modules 112 may be implemented by the processor 122 executing software instructions 128, and may be generally configured to detect objects and obstacles 142 from the sensor data 134. The object detection machine learning modules 112 may be implemented using neural networks and/or machine learning algorithms for detecting objects from any data type, such as images, videos, infrared images, point clouds, Radar data, etc.

In some embodiments, the object detection machine learning modules 112 may be implemented using machine learning algorithms, such as Support Vector Machine (SVM), Naive Bayes, Logistic Regression, k-Nearest Neighbors, Decision Trees, or the like. In some embodiments, the object detection machine learning modules 112 may utilize a plurality of neural network layers, convolutional neural network layers, and/or the like, in which weights and biases of these layers are optimized in the training process of the object detection machine learning modules 112. The object detection machine learning modules 112 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, Radar data, etc. labeled with object(s) in each sample data. The object detection machine learning modules 112 may be trained, tested, and refined by the training dataset and the sensor data 134. The object detection machine learning modules 112 use the sensor data 134 (which are not labeled with objects) to increase their accuracy of predictions in detecting objects. For example, supervised and/or unsupervised machine learning algorithms may be used to validate the predictions of the object detection machine learning modules 112 in detecting objects in the sensor data 134.

Map data 114 may include a virtual map of a city or an area that includes the road 102. In some examples, the map data 114 may include the map 658 and map database 636 (see FIG. 6 for descriptions of the map 658 and map database 636). The map data 114 may include drivable areas, such as roads 102, paths, highways, and undrivable areas, such as terrain (determined by the occupancy grid module 660, see FIG. 6 for descriptions of the occupancy grid module 660). The map data 114 may specify location coordinates of road signs, lanes, lane markings, lane boundaries, road boundaries, traffic lights, obstacles, etc.

Routing plan 116 is a plan for traveling from a start location (e.g., a first autonomous vehicle launchpad/landing pad) to a destination (e.g., a second autonomous vehicle launchpad/landing pad). For example, the routing plan 116 may specify a combination of one or more streets, roads, and highways in a specific order from the start location to the destination. The routing plan 116 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 116 may include other information about the route from the start position to the destination, such as road/traffic signs in that routing plan 116, etc.

Driving instructions 118 may be implemented by the planning module 662 (See descriptions of the planning module 662 in FIG. 6). The driving instructions 118 may include instructions and rules to adapt the autonomous driving of the autonomous vehicle 502 according to the driving rules of each stage of the routing plan 116. For example, the driving instructions 118 may include instructions to stay within the speed range of a road 102 traveled by the autonomous vehicle 502, adapt the speed of the autonomous vehicle 502 with respect to observed changes by the sensors 546, such as speeds of surrounding vehicles, objects within the detection zones of the sensors 546, etc.

The control device 550 may receive the object detection machine learning modules 112, map data 114, routing plan 116, driving instructions 118, and/or any other data/instructions from an oversight server (not shown) that may be configured to oversee operations of the autonomous vehicle 502, build the map data 114, determine the routing plan 116, and determine the driving instructions 118, among other operations.

Threshold distance 132 may generally represent a safe distance that the control device 550 keeps (or attempts to keep) between the autonomous vehicle 502 and its surrounding objects/obstacles 142. In one example, the control device 550 may define the threshold distance 132 based on road conditions 154, such as traffic and weather on the road 102 traveled by the autonomous vehicle 502. For example, in congested traffic, the threshold distance 132 from the autonomous vehicle 502 may be larger (e.g., eight feet or any suitable distance) compared to a road without traffic. In another example, during severe weather conditions, the threshold distance 132 from the autonomous vehicle 502 may be larger (e.g., six feet, seven feet, or any suitable distance) compared to normal weather conditions. In another example, the control device 550 may define a different threshold distance 132 between the autonomous vehicle 502 and each object 142 based on one or more of the size of the object 142 and type of the object 142 (e.g., vehicle, pedestrian, road sign, etc.). For example, if a first object 142 is a small vehicle 108, a first threshold distance 132 between the small vehicle 108 and the autonomous vehicle 502 may be determined to be smaller compared to a threshold distance 132 between the autonomous vehicle 502 and an oversized vehicle 108. In another example, if a second object 142 is a pedestrian or a person on a side of a road, a second threshold distance 132 between the pedestrian and the autonomous vehicle 502 may be larger compared to a threshold distance 132 between the autonomous vehicle 502 and a road sign.

In some embodiments, the control device 550 may define a safety boundary or bounding box around each object 142 on and around the road 102 based on the size and type of the object 142, such as vehicle, pedestrian, road sign, etc. The bounding box around each object 142 may represent a safe distance that the control device 550 keeps (or attempts to keep) between the autonomous vehicle 502 and each object 142. The control device 550 may determine various threshold distances 132 between the autonomous vehicle 502 and each object 142 on and around the road 102 using the boundary boxes around each object 142.

Operational Flow for Implementing a Lane Bias Maneuver

The operational flow of the system 100 begins when the control device 550 receives sensor data 134 from the sensors 546.

In an example operation, assume that the autonomous vehicle 502 is traveling along the road 102. While traveling, the sensors 546 capture sensor data 134 that describe the environment around the autonomous vehicle 502. The sensor data 134 is associated with one or more objects on the road 102. From the sensor data 134, the control device 550 may detect the position of the lane marker 106, and the distances 136a and 136b between the autonomous vehicle 502 and the lane markers 106a and 106b, respectively, by implementing the object detection machine learning modules 112.

Assuming that a vehicle 108 is on the road 102, the control device 550 may detect the presence of the vehicle 108 from the sensor data 134. The control device 550 may determine a lateral distance 138 between the autonomous vehicle 502 and the vehicle 108.

The control device 550 may compare the lateral distance 138 with the threshold distance 132. The control device 550 may determine whether to instruct the autonomous vehicle 502 to perform the lane bias maneuver 130 based on the comparison between the lateral distance 138 and the threshold distance 132. If the control device 550 determines that performing the lane bias maneuver 130 is safe and executable, the control device 550 may instruct the autonomous vehicle 502 to perform the lane bias maneuver 130. Otherwise, the control device 550 may instruct the autonomous vehicle 502 to perform a minimal risk maneuver 140.

In some example scenarios, the autonomous vehicle 502 may encounter a vehicle 108 1) on either side adjacent to the autonomous vehicle 502; 2) on either side and in front of the autonomous vehicle 502; and 3) in front of the autonomous vehicle 502, where the vehicle 108 is stopped on a side of a road 102. The corresponding description below describes various exemplary use cases of encountering a vehicle 108 (or generally a non-player character 144) that may lead to performing the lane bias maneuver 130.

Encountering a Vehicle Adjacent to the Autonomous Vehicle

In an example use case, assume that the control device 550 detects the presence of a vehicle 108a from the sensor data 134 by implementing the object detection machine learning modules 112, where the vehicle 108a is detected on either side of the autonomous vehicle 502.

The control device 550 may determine whether to instruct the autonomous vehicle 502 to perform the lane bias maneuver 130 to avoid the vehicle 108a, whether lane bias maneuver 130 is executable and safe, and instruct the autonomous vehicle 502 to perform the lane bias maneuver 130 if it is determined that the lane bias maneuver 130 is executable and safe, as described below.

In this process, the control device 550 may determine the lateral distance 138a between the autonomous vehicle 502 and the vehicle 108a from the sensor data 134. The control device 550 may compare the lateral distance 138a with the threshold distance 132.

In the example of FIG. 1, the control device 550 may determine that the lateral distance 138a between the autonomous vehicle 502 and the vehicle 108a is less than the threshold distance 132. In response, the control device 550 may determine whether to instruct the autonomous vehicle 502 to perform the lane bias maneuver 130. If the control device 550 determines that performing the lane bias maneuver 130 is executable and safe, the control device 550 may instruct the autonomous vehicle 502 to perform the lane bias maneuver 130. Otherwise, the control device 550 may instruct the autonomous vehicle 502 to perform a minimal risk maneuver 140. The minimal risk maneuver 140 may include slowing down or speeding up the autonomous vehicle 502 until the autonomous vehicle 502 and the vehicle 108a are no longer adjacent to each other.

In one example as illustrated in FIG. 1, the vehicle 108a may have intruded (or crossed over) the lane marker 106a. To determine whether the vehicle 108a has crossed over the lane marker 106a, the control device 550 may perform one or more operations described below.

The control device 550 may determine the distance 136a between the autonomous vehicle 502 and the lane marker 106a. The control device 550 may compare the distance 136a with the lateral distance 138a between the autonomous vehicle 502 and the vehicle 108a. If the control device 550 determines that the distance 136a is less that the lateral distance 138a between the autonomous vehicle 502 and the vehicle 108a, the control device 550 may determine that the vehicle 108a has intruded into the lane 104a. Otherwise, the control device 550 may determine that the vehicle 108a has not intruded into the lane 104a.

In this example, the control device 550 may determine that the vehicle 108a is intruding into the current lane 104a traveled by the autonomous vehicle 502 in response to determining that the lateral distance 138a between the autonomous vehicle 502 and the vehicle 108a is less than the distance 136a between the autonomous vehicle 502 and the lane marker 106a. In response, the control device 550 may determine whether to instruct the autonomous vehicle 502 to perform the lane bias maneuver 130 and whether performing the lane bias maneuver is safe and executable.

Determining Whether Performing the Lane Bias Maneuver is Executable

To determine whether performing the lane bias maneuver 130 is executable, the control device 550 may perform one or more operations described below.

In some embodiments, the control device 550 may determine whether performing the lane bias maneuver 130 is executable based on determining whether there is enough room or distance 136 available on the other side of the autonomous vehicle 502 to perform the lane bias maneuver 130. To this end, the control device 550 may determine how much of the current lane 104a is intruded by the vehicle 108a. For example, the control device 550 may determine the amount of the intruded distance 146 into the lane 104a that is intruded by the vehicle 108a.

The control device 550 may determine an available distance 136b (or available room 136b) on the other side of the autonomous vehicle 502 on the current lane 104a. The control device 550 may determine whether there is enough room 136b or available distance 136b on the other side of the autonomous vehicle 502 to perform the lane bias maneuver, i.e., drive off-center and bias toward the lane marker 106b. To this end, the control device 550 may compare the intruded distance 146 with the available distance 136b.

The control device 550 may determine whether the lane bias maneuver 130 can be performed based on the comparison between the intruded distance 146 and the available distance 136b. If the control device 550 determines that the available distance 136b is larger than the intruded distance 146 (and/or that there is enough available distance 136b to perform the lane bias maneuver 130), the control device 550 may instruct the autonomous vehicle 502 to perform the lane bias maneuver 130.

The control device 550 may instruct the autonomous vehicle 502 to perform the lane bias maneuver 130 if the control device 550 determines that the lane bias maneuver 130 can be performed or is executable and safe. The process of determining whether performing the lane bias maneuver 130 is safe is described further below. In brief, the control device 550 may determine that performing the lane bias maneuver 130 is safe by determining whether there is traffic (e.g., another vehicle 108) on the road 102, i.e., whether the traffic allows the autonomous vehicle 502 to perform the lane bias maneuver 130. If it is determined that there is no or minor traffic on the road 102, the control device 550 may determine that performing the lane bias maneuver 130 is safe and instruct the autonomous vehicle 502 to perform the lane bias maneuver 130.

If the control device 550 determines that the available distance 136b is smaller than the intruded distance 146 (and/or that there is not enough available distance 136b to perform the lane bias maneuver 130), the control device 550 may determine that the lane bias maneuver 130 cannot be performed or is not executable. In response, the control device 550 may instruct the autonomous vehicle 502 to perform a minimal risk maneuver 140. In these operations, the control device 550 takes the size, width, and length of the autonomous vehicle 502 into account when determining whether there is enough available distance 136b to perform the lane bias maneuver 130.

In some embodiments, the control device 550 may determine whether performing the lane bias maneuver 130 is executable based on determining if the lane bias maneuver 130 is performed, the future lateral distance 138a between the autonomous vehicle 502 and the vehicle 108a will be at least equal to the threshold distance 132 within a threshold time period 148.

If the control device 550 determines that if the lane bias maneuver 130 is performed, the future lateral distance 138a between the autonomous vehicle 502 and the vehicle 108a will be at least equal to the threshold distance 132 within the threshold time period 148, the control device 550 may determine that the lane bias maneuver 130 is executable. In response, the control device 550 may instruct the autonomous vehicle 502 to perform the lane bias maneuver 130, if it is determined to be safe. Otherwise, the control device 550 may instruct the autonomous vehicle 502 to perform a minimal risk maneuver 140.

The threshold time period 148 may be two minutes, five minutes, or any other suitable time duration. The control device 550 may define the threshold time period 148 based on one or more of the road condition data 154 (such as traffic data and weather data associated with the road 102), size of the autonomous vehicle 502, speed of the autonomous vehicle 502, trajectory 150 of the autonomous vehicle 502, and size of the vehicle 108a, speed of the vehicle 108a, and trajectory 152 of the vehicle 108a.

To determine whether the lane bias maneuver 130 can be performed within the threshold time period 148, the control device 550 may perform one or more operations below.

The control device 550 may determine a speed (or estimated speed) and position of the vehicle 108a, for example, from the sensor data 134. Based on the speed and the position of the vehicle 108a, the control device 550 may determine the trajectory 152 of the vehicle 108a. Similarly, the control device 550 may determine the trajectory 150 of the autonomous vehicle 502 if the lane bias maneuver 130 is performed based on the speed and the position of the autonomous vehicle 502.

The control device 550 predicts the future lateral distance 138a between the autonomous vehicle 502 and the vehicle 108a, if the autonomous vehicle 502 followed the trajectory 150 and the vehicle 108a followed the trajectory 152.

The control device 550 may compare the future lateral distance 138a with the threshold distance 132. The control device 550 may determine that the lane bias maneuver 130 can be performed within the threshold time period 148 if the future lateral distance 138a is at least equal to the threshold distance 132 within the threshold time period 148. In response, the control device 550 may instruct the autonomous vehicle 502 to perform the lane bias maneuver 130 (if it is determined to be safe).

In some embodiments, if the control device 550 determines that the predicated future lateral distance 138a will be less than the threshold distance 132 within the threshold time period 148, the control device 550 may determine that the lane bias maneuver 130 cannot be performed and/or is not safe to be performed, e.g., due to traffic on the road 102. In response, the control device 550 may instruct the autonomous vehicle 502 to perform a minimal risk maneuver 140.

In another embodiment, if the control device 550 determines that the predicated future lateral distance 138a will be less than the threshold distance 132 within the threshold time period 148, the control device 550 may determine whether it is safe to cross over to the adjacent lane 104c based on traffic on the lane 104c. If the control device 550 determines that there is no or minor traffic (e.g., another vehicle 108) in the adjacent lane 104c, the control device 550 may determine that it is safe to temporarily cross over to the lane 104c. In response, the control device 550 may instruct the autonomous vehicle 502 to perform the lane bias maneuver 130 and instruct the autonomous vehicle 502 to temporarily cross over to the lane 104c and take as much space from the lane 104c until the lateral distance 138a between the autonomous vehicle 502 and the vehicle 108a is equal to the threshold distance 132. The control device 550 may instruct the autonomous vehicle 502 to drive back to its original lane 104a when it is determined that the autonomous vehicle 502 and the vehicle 108a are no longer adjacent to each other.

In some embodiments, the control device 550 may determine whether performing the lane bias maneuver 130 is executable based on the road structure. For example, if the autonomous vehicle 502 is traveling on a curved road, a trailer attached to the semi-truck tractor unit of the autonomous vehicle 502 occupies more space in the lane. Thus, the control device 550 may take the road structure into account when determining whether performing the lane bias maneuver 130 is executable. This use case is described in detail in FIGS. 3 and 4.

Performing the Lane Bias Maneuver

In some embodiments, in response to determining that performing the lane bias maneuver 130 is executable and safe, the control device 550 may instruct the autonomous vehicle 502 to perform the lane bias maneuver 130.

To this end, the control device 550 causes the autonomous vehicle 502 to drive off-center of the current lane 104a and bias toward lane marker 106b (i.e., the other side of the lane 104a compared to where the vehicle 108a is detected).

The control device 550 may determine the lane bias amount 110. The lane bias amount 110 is a distance between the centerline of the current lane 104a and the trajectory line 150. In other words, the lane bias amount 110 is a distance that the autonomous vehicle 502 diverts from the centerline of the lane 104a until the lateral distance 138a between the autonomous vehicle 502 and the vehicle 108a is at least equal to the threshold distance 132. The autonomous vehicle 502 may perform the lane bias maneuver 130 until the lateral distance 138a between the autonomous vehicle 502 and the vehicle 108a is at least equal to the threshold distance 132.

The control device 550 may maintain a consistent lane bias amount 110 until the autonomous vehicle 502 is no longer adjacent to the vehicle 108. In some embodiments, the control device 550 may maintain a consistent lane bias amount 110 even if the vehicle 108 swerves causing the lateral distance 138 to change. In some embodiments, the control device 550 may adjust the lane bias amount 110 to keep at least the threshold distance 132 with the vehicle 108.

Performing a Minimal Risk Maneuver

In some embodiments, in response to determining that performing the lane bias maneuver 130 is not executable (and is not safe to be performed), the control device 550 may instruct the autonomous vehicle 502 to perform a minimal risk maneuver 140. The minimal risk maneuver 140 may include slowing down the autonomous vehicle 502, speeding up the autonomous vehicle 502, among other maneuvers until the autonomous vehicle 502 and the vehicle 108a are not adjacent to each other.

In the example of encountering the vehicle 108a that is on either side of the autonomous vehicle 502, if the control device 550 determines that the speed of the vehicle 108a is more than the speed of the autonomous vehicle 502, the minimal risk maneuver 140 may include slowing down the autonomous vehicle 502 and letting the vehicle 108a to pass by the autonomous vehicle 502. In another example, if the control device 550 determines that the speed of the vehicle 108a is less than the speed of the autonomous vehicle 502, the minimal risk maneuver 140 may include speeding up the autonomous vehicle 502. In another example, if the vehicle 108a is behind the autonomous vehicle 502, the minimal risk maneuver 140 may include speeding up the autonomous vehicle 502. In another example, if the vehicle 108a is in front of the autonomous vehicle 502, the minimal risk maneuver 140 may include slowing down the autonomous vehicle 502.

In some embodiments, the control device 550 may perform the minimal risk maneuver 140 in addition to the lane bias maneuver 130 if it is determined that the lane bias maneuver is executable and safe.

Encountering a Vehicle in Front and on Either Side of the Autonomous Vehicle

In another use case, assume that the control device 550 detects the presence of a vehicle 108b from the sensor data 134 by implementing the object detection machine learning modules 112, where the vehicle 108b is detected in front of the autonomous vehicle 502 and on either side of the lane 104a traveled by the autonomous vehicle 502.

The control device 550 may determine whether to instruct the autonomous vehicle 502 to perform the lane bias maneuver 130 to avoid the vehicle 108b, whether lane bias maneuver 130 is executable and safe, and instruct the autonomous vehicle 502 to perform the lane bias maneuver 130 if it is determined that the lane bias maneuver 130 is executable and safe, as described below.

In this process, the control device 550 may determine the lateral distance 138b between the autonomous vehicle 502 and the vehicle 108b by analyzing the sensor data 134. The control device 550 may compare the lateral distance 138b with the threshold distance 132.

In the example of FIG. 1, the control device 550 may determine that the lateral distance 138b between the autonomous vehicle 502 and the vehicle 108b is less than the threshold distance 132. In the illustrated example, the control device 550 may determine that the vehicle 108b is driving too close to the lane marker 106a between the autonomous vehicle 502 and the vehicle 108b. For example, the control device 550 may determine that the distance 160 between the vehicle 108b and the lane marker 106a is less than a threshold, e.g., less than twenty inches, forty inches, or any other suitable distance.

In response, the control device 550 may determine whether to instruct the autonomous vehicle 502 to perform the lane bias maneuver 130. Similar to that described above with respect to the example of vehicle 108a, if the control device 550 determines that performing the lane bias maneuver 130 is executable and safe, the control device 550 may instruct the autonomous vehicle 502 to perform the lane bias maneuver 130. Otherwise, the control device 550 may instruct the autonomous vehicle 502 to perform a minimal risk maneuver 140. These operations are described below.

Determining Whether Performing the Lane Bias Maneuver is Executable

In some embodiments, the control device 550 may determine whether performing the lane bias maneuver 130 is executable within the threshold time period 148 based on the lateral distance 138b, longitudinal distance 156, trajectory 150 of the autonomous vehicle 502 if the lane bias maneuver 130 is executed, and the trajectory 158 of the vehicle 108b, as described below.

The control device 550 may determine the longitudinal distance 156 between the autonomous vehicle 502 and the vehicle 108b from the sensor data 134.

The control device 550 may determine the trajectory 150 of the autonomous vehicle 502 if the lane bias maneuver 130 is performed based on the speed and the position of the autonomous vehicle 502, similar to that described above. Similarly, the control device 550 may determine the trajectory 158 of the vehicle 108b based on the position and speed (or estimated speed) of the vehicle 108b.

The control device 550 predicts the future lateral distance 138b between the autonomous vehicle 502 and the vehicle 108b if the autonomous vehicle 502 followed the trajectory 150 and the vehicle 108b followed the trajectory 158.

The control device 550 may compare the predicted future lateral distance 138b with the threshold distance 132. If the control device 550 determines that the predicated future lateral distance 138b will be more than or equal to the threshold distance 132 within the threshold time period 148, the control device 550 may determine that the lane bias maneuver 130 can be performed. In response, the control device 550 may instruct the autonomous vehicle 502 to perform the lane bias maneuver 130 (if it is determined to be safe).

In some embodiments, if the control device 550 determines that the predicated future lateral distance 138b will be less than the threshold distance 132 within the threshold time period 148, the control device 550 may determine that the lane bias maneuver 130 cannot be performed within the threshold time period 148. In response, the control device 550 may instruct the autonomous vehicle 502 to perform a minimal risk maneuver 140.

In another embodiment, if the control device 550 determines that the predicated future lateral distance 138b will be less than the threshold distance 132 within the threshold time period 148, the control device 550 may determine whether it is safe to temporarily cross over to the adjacent lane 104c, similar to that described above with respect to the example use case of encountering the vehicle 108a. If it is determined that it is safe to temporarily cross over to the lane 104c, the control device 550 may drive the autonomous vehicle 502 over the lane marker 106b until the lateral distance 138b between the autonomous vehicle 502 and the vehicle 108b is at least equal to the threshold distance 132. Once the autonomous vehicle 502 and the vehicle 108b are no longer adjacent to each other, the control device 550 may drive the autonomous vehicle 502 back to its original lane 104a.

Determining Whether it is Safe to Perform the Lane Bias Maneuver

In some embodiments, the control device 550 may determine whether it is safe to perform the lane bias maneuver 130 based on road condition data 154 (e.g., traffic data and weather data) and/or historical driving behaviors 162 associated with the surrounding vehicles 108. To this end, while traveling along the road 102, the control device 550 may record the driving behaviors 162 associated with the vehicles 108 on the road 102.

In one example, the control device 550 may determine that it is not safe to perform the lane bias maneuver 130 if it is determined that a driving pattern prediction 164 of a vehicle 108 is less than a threshold percentage, e.g., less than 70%, 60%, etc., i.e., the driving pattern of the vehicle 108 is highly unpredictable. The control device 550 may determine the driving pattern prediction 164 based on the historical driving behaviors 162. In another example, the control device 550 may determine that it is not safe to perform the lane bias maneuver 130 if it is determined that the historical driving behavior 162 of a vehicle 108 indicates that the vehicle 108 has been intruding or invading one or more lanes 104, or driving too close to lane markers 106 (e.g., driving with less than a threshold distance from the lane markers 106).

In one example with respect to the vehicle 108b, the control device 550 may determine that the historical driving behavior 162 of the vehicle 108b indicates that the vehicle 108b has been intruding or invading one or more lanes 104. In another example with respect to the vehicle 108b, the control device 550 may determine that the historical driving behavior 162 of the vehicle 108b indicates that the vehicle 108b has been driving too close to lane markers 106 (e.g., with less than a threshold distance from the lane markers 106).

In such cases, the control device 550 may determine that it is not safe to perform the lane bias maneuver 130.

In some embodiments, the control device 550 may determine that it is not safe to perform the lane bias maneuver 130 if it is determined that the lane bias maneuver 130 cannot be performed within the threshold time period 148, for example, due to road conditions 154, such as congested traffic or undesirable weather conditions on the road 102.

Encountering a Stopped Vehicle in Front of the Autonomous Vehicle

In another use case, assume that the control device 550 detects the presence of a vehicle 108c from the sensor data 134 by implementing the object detection machine learning modules 112, where the vehicle 108c is stopped in front of the autonomous vehicle on a side of the road 102 traveled by the autonomous vehicle 502. Similarly, the control device 550 may detect the presence of a person on a side of the road 102 from the sensor data 134.

In a similar use case, the sensors 546 may detect any stationary object 142 on a side of the road 102 that is: 1) occupying at least a portion of the road; 2) invading a lane 104 of the road 102; 3) on an emergency lane; or 4) on the other side of the lane marker 106b but too close to the lane marker 106b (e.g., a distance between the object 142 and the lane marker 106b is less than a threshold, such as twenty inches, forty inches, etc.). The stationary object 142 may include construction cones, construction barriers, construction workers, construction equipment, pedestrians, vehicles, and/or any other object 142.

The control device 550 may determine whether to instruct the autonomous vehicle 502 to perform the lane bias maneuver 130 to avoid the vehicle 108c, whether the lane bias maneuver 130 is executable and safe, and instruct the autonomous vehicle 502 to perform the lane bias maneuver 130 if it is determined that the lane bias maneuver 130 is executable and safe, as described below.

In this process, the control device 550 may determine the lateral distance 138c between the autonomous vehicle 502 and the vehicle 108c by analyzing the sensor data 134. The control device 550 may compare the lateral distance 138c with the threshold distance 132.

In the example of FIG. 1, the control device 550 may determine that the lateral distance 138c between the autonomous vehicle 502 and the vehicle 108c is less than the threshold distance 132. In the illustrated example, the control device 550 determines that the vehicle 108c has crossed over the lane boundary 106b based on determining that the lateral distance 138c is less than the distance 136b between the autonomous vehicle 502 and the lane boundary 106b.

In response, the control device 550 may determine whether to instruct the autonomous vehicle 502 to perform the lane bias maneuver 130. Similar to that described above with respect to the example of vehicle 108a, if the control device 550 determines that performing the lane bias maneuver 130 is executable and safe, the control device 550 may instruct the autonomous vehicle 502 to perform the lane bias maneuver 130. Otherwise, the control device 550 may instruct the autonomous vehicle 502 to perform a minimal risk maneuver 140. These operations are described below.

Determining Whether Performing the Lane Bias Maneuver is Executable

In some embodiments, the control device 550 may determine whether performing the lane bias maneuver 130 is executable within the threshold time period 148 based on the lateral distance 138c, longitudinal distance 166, trajectory 150 of the autonomous vehicle 502 if the lane bias maneuver 130 is executed, and determining whether there is enough room or distance 136a on the other side of the autonomous vehicle 502 to perform the lane bias maneuver 130, as described below.

The control device 550 may determine the trajectory 166 of the autonomous vehicle 502 based on the speed and position of the autonomous vehicle 502 if the lane bias maneuver 130 is performed, similar to that described above with respect to determining the trajectory 150.

The control device 550 predicts the future lateral distance 138c between the autonomous vehicle 502 and the vehicle 108c if the autonomous vehicle 502 followed the trajectory 166. The control device 550 may compare the predicted future lateral distance 138c with the threshold distance 132.

If the control device 550 determines that the predicted future lateral distance 138c will be more than or equal to the threshold distance 132 within the threshold time period 148, the control device 550 may determine that the lane bias maneuver 130 can be performed. In response, the control device 550 may perform the lane bias maneuver 130 (if it is determined to be safe).

In some embodiments, the control device 550 may determine a classification of vehicles 108 based on their size. For example, the control device 550 may classify oversized vehicles 108, such as buses, into a first class, normal-sized vehicles 108, such as family cars, into a second class, and so on. Thus, determining whether to perform the lane bias maneuver 130 may further be based on a particular class to which the encountered vehicle 108 belongs.

In some embodiments, if the control device 550 determines that the predicted future lateral distance 138c will be less than the threshold distance 132 within the threshold time period 148, the control device 550 may determine that the lane bias maneuver 130 cannot be performed within the threshold time period 148. In response, the control device 550 may instruct the autonomous vehicle 502 to perform a minimal risk maneuver 140. In another embodiment, if the control device 550 determines that the predicated future lateral distance 138c will be less than the threshold distance 132 within the threshold time period 148, the control device 550 may determine whether it is safe to cross over to the adjacent lane 104d, similar to that described above with respect to the example use case of encountering the vehicle 108a.

Example Method for Implementing a Lane Bias Maneuver

FIG. 2 illustrates an example flowchart of a method 200 for implementing a lane bias maneuver 130 for autonomous vehicles 502. Modifications, additions, or omissions may be made to method 200. Method 200 may include more, fewer, or other operations. For example, operations may be performed in parallel or in any suitable order. While at times discussed as the autonomous vehicle 502, control device 550, or components of any of thereof performing operations, any suitable system or components of the system may perform one or more operations of the method 200. For example, one or more operations of method 200 may be implemented, at least in part, in the form of software instructions 128 and processing instructions 580, respectively, from FIGS. 1 and 5, stored on non-transitory, tangible, machine-readable media (e.g., memory 126 and data storage 590, respectively, from FIGS. 1 and 5) that when run by one or more processors (e.g., processors 122 and 570, respectively, from FIGS. 1 and 5) may cause the one or more processors to perform operations 202-218.

Method 200 begins at operation 202 where the control device 550 receives sensor data 134 from sensors 546 associated with an autonomous vehicle 502. The control device 550 may receive the sensor data 134 from the sensors 546 continuously, periodically (e.g., every second, every five seconds, or any suitable duration), and/or on-demand.

At operation 204, the control device 550 may detect the presence of a vehicle 108 from the sensor data 134. For example, the control device 550 may implement the object detection machine learning modules 112 to detect the vehicle 108 from the sensor data 134. The control device 550 may detect the presence of any of the vehicles 108a, 108b, or 108c described in FIG. 1. Similarly, the control device 550 may detect the presence of any obstacle/object 142 and/or non-player character 144 from the sensor data 134.

At operation 206, the control device 550 may determine a lateral distance 138 between the autonomous vehicle 502 and the vehicle 108. For example, the control device 550 may determine the lateral distance 138a, 138b, or 138c between the autonomous vehicle 502 and each of the vehicles 108a, 108b, and 108c, respectively, similar to that described in FIG. 1.

At operation 208, the control device 550 may compare the lateral distance 138 with the threshold distance 132 from the autonomous vehicle 502. The control device 550 may define the threshold distance 132, similar to that described in FIG. 1.

At operation 210, the control device 550 may determine whether the lateral distance 138 between the autonomous vehicle 502 and the vehicle 108 is less than the threshold distance 132. In this process, the control device 550 may determine whether to instruct the autonomous vehicle 502 to perform the lane bias maneuver 130. If the control device 550 determines that the lateral distance 138 between the autonomous vehicle 502 and the vehicle 108 is less than the threshold distance 132, method 200 may proceed to operation 212. Otherwise, method 200 returns to operation 202. In other words, if the control device 550 determines that the lateral distance 138 between the autonomous vehicle 502 and the vehicle 108 is equal to or more than the threshold distance 132, the control device 550 may determine that the autonomous vehicle 502 is keeping a safe distance from the vehicle 108. Thus, the control device 550 may continue to monitor and evaluate distances between the autonomous vehicle 502 and other vehicles 108 (or objects 142).

At operation 212, the control device 550 may determine whether a lane bias maneuver 130 is executable.

In some embodiments, the control device 550 may determine that the lane bias maneuver 130 is executable if it is determined that the lane bias maneuver 130 can be performed within a threshold time period 148. In other words, the control device 550 may determine that the lane bias maneuver 130 is executable if by performing the lane bias maneuver 130, the future lateral distance 138 between the autonomous vehicle 502 and the vehicle 108 will be at least equal to the threshold distance 132 within the threshold time period 148, similar to that described in FIG. 1.

In some embodiments, the control device 550 may determine whether the lane bias maneuver 130 is executable based on the road structure. For example, if the road 102 has high curvature (e.g., more than sixty degrees, seventy degrees, etc.), the control device 550 may determine that the lane bias maneuver 130 is not executable. If the control device 550 determines that the lane bias maneuver 130 is executable, method 200 may proceed to operation 216. Otherwise, method 200 may proceed to operation 214.

At operation 214, the control device 550 may instruct the autonomous vehicle 502 to perform a minimal risk maneuver 140. For example, the minimal risk maneuver 140 may include slowing down or speeding up the autonomous vehicle 502 until the autonomous vehicle 502 and the vehicle 108 are no longer adjacent to each other.

At operation 216, the control device 550 may determine whether performing the lane bias maneuver 130 is safe.

In some embodiments, the control device 550 may determine whether performing the lane bias maneuver 130 is safe based on the historical driving behavior 162 associated with the vehicle 108. For example, if the control device 550 determines that the historical driving behavior 162 associated with the vehicle 108 indicates that the driving behavior of the vehicle 108 is highly unpredictable, e.g., the driving pattern prediction 164 of the vehicle 108 is less than a threshold percentage, such as 60%, 55%, etc., the control device 550 may determine that it is not safe to perform the lane bias maneuver 130, similar to that described in FIG. 1.

In another example, the control device 550 may determine whether performing the lane bias maneuver 130 is safe based on road conditions 154, such as traffic and weather on the road 102. For example, if the control device 550 determines that there is congested traffic on the road 102 and/or there is a severe weather condition to the extent that a risk of collision with another vehicle 108 may become more than a threshold percentage (e.g., more than 10%, 15%, etc.) by performing the lane bias maneuver 130, the control device 550 may determine that it is not safe to perform the lane bias maneuver 130. If it is determined that it is not safe to perform the lane bias maneuver 130, method 200 may proceed to operation 214. Otherwise, method 200 may proceed to operation 218.

At operation 218, the control device 550 may instruct the autonomous vehicle 502 to perform the lane bias maneuver 130. In this process, the control device 550 drives the autonomous vehicle 502 off-center (with the distance of the lane bias amount 110) in the current lane 104*a* toward the opposite direction with respect to the vehicle 108 until the lateral distance 138 between the vehicle 108 and the autonomous vehicle 502 is at least equal to the threshold distance 132, similar to that described above in FIG. 1.

Example System for Implementing a Lane Bias Maneuver to Negotiate a Curved Road

FIG. 3 illustrates an embodiment of a system 300 for implementing a lane bias maneuver 130 for autonomous vehicles 502 to negotiate a curved road 302. FIG. 3 further illustrates a simplified diagram of a curved road 302 traveled by the autonomous vehicle 502. In some embodiments, system 300 comprises an autonomous vehicle 502 and its components, including the control device 550 and sensors 546.

The control device 550 comprises the processor 122 in signal communication with the memory 126. Memory 126 may store software instructions 312 that when executed by the processor 122 cause the control device 550 to perform one or more functions described herein. For example, when the software instructions 312 are executed, the processor 122 implements the lane bias maneuver 130 to negotiate a curved road 302. The system 300 may be configured as shown or in any other configuration.

In general, system 300 may be configured to implement the lane bias maneuver 130 in response to detecting that the autonomous vehicle 502 is approaching a curved road, such as the exemplary illustrated curved road 302 and/or when the trailer 318 of the autonomous vehicle 502 swings or diverts from the straight line and creates a trailer angle 342 between the semi-truck tractor unit 316 and the trailer 318 of the autonomous vehicle 502, for example, due to the wind going across the autonomous vehicle 502 even on a straight road. The semi-truck tractor unit 316 is interchangeably referred to herein as a cab 316 of the autonomous vehicle 502.

As briefly described in FIG. 1, in some cases, when the autonomous vehicle 502 is driving on a curved lane 304 on the curved road 302, the trailer 318 of the autonomous vehicle 502 may inadvertently divert or swing from the centerline of the curved lane 304.

In some cases, a distance between the autonomous vehicle 502 and a vehicle on the curved road 302 may become less than a threshold distance 132 due to the trailer 318 of the autonomous vehicle 502 diverting from the centerline of the curved lane 304. Likewise, when wind is going across the autonomous vehicle 502 (either when the autonomous vehicle 502 is on a curved or straight road), the wind might cause the trailer 318 of the autonomous vehicle 502 to divert or swing from the centerline of the current lane, and create a trailer angle 342 between the trailer 318 and the cab 316 of the autonomous vehicle 502. For example, a distance between the autonomous vehicle 502 and a vehicle on the curved or a straight road may become less than a threshold distance 132 due to the trailer 318 of the autonomous vehicle 502 diverting from the centerline of the curved or the straight lane.

These situations may lead to unsafe driving conditions for the autonomous vehicle 502 and the vehicle(s) on either side of the autonomous vehicle 502 on the curved or the straight road. In such cases, the control device 550 may implement the lane bias maneuver 130 to drive the autonomous vehicle 502 off-center in the curved lane 304 so that the autonomous vehicle 502 does not invade the side lanes. In other words, the control device 550 may implement the lane bias maneuver 130 so neither the cab 316 nor the trailer 318 divert into a side lane.

To this end, the control device 550 calculates the total lane bias adjustment amount 320 that is the distance of driving the autonomous vehicle 502 off-center in the current lane to perform the lane bias maneuver 130. The process of calculating the distance to drive the autonomous vehicle 502 off-center in the current lane 304 (i.e., total lane bias adjustment amount 320) is described further below in conjunction with the operational flow of system 300.

In brief, to calculate the total lane bias adjustment amount 320, the control device 550 calculates the first lane bias adjustment amount 330 that is associated with the road curvature 328, calculates the second lane bias adjustment amount 340 that is associated with the trailer angle 342, and combines them together. In calculating the first lane bias adjustment amount 330, that the trailer angle 342 is represented (or assumed) to be zero, and the control device 550 calculates the first lane bias adjustment amount 330 in isolation. In calculating the second lane bias adjustment amount 340, the road 302 is represented (or assumed) to be straight, and the control device 550 calculates the second lane bias adjustment amount 340 in isolation. In this disclosure, the first lane bias adjustment amount 330 may be interchangeably referred to herein as the first lane bias adjustment distance amount 330, the second lane bias adjustment amount 340 may be interchangeably referred to herein as the second lane bias adjustment distance amount 340, and the total lane bias adjustment amount 320 may be interchangeably referred to herein as the total lane bias adjustment distance amount 320.

In certain embodiments, the system 100 of FIG. 1 or the system 300 of FIG. 3 may perform one or more operations of the operational flow described in FIG. 1, one or more operations of the method 200 described in FIG. 2, one or more operations of the operational flow described in FIG. 3, and one or more operations of the method 400 described in FIG. 4.

In certain embodiments, a system may include one or more components of the system 100 of FIG. 1 and the system 300 of FIG. 3, and may be configured to perform one or more operations of the operational flow described in FIG. 1, one or more operations of the method 200 described in FIG. 2, one or more operations of the operational flow 300 described in FIG. 3, and one or more operations of the method 400 described in FIG. 4.

System Components

Aspects of the control device 550 are described in FIGS. 1 and 2, and additional aspects are described below. The memory 126 may be further configured to store software instructions 312, road radius 322, trailer angle 342, trailer length 326, lane bias maneuver 130, map data 114, sensor data 314, first lane bias adjustment amount 330, second lane bias adjustment amount 340, total lane bias adjustment amount 320, lane bias amount 110, final lane bias amount 350, trailer bias amount 352, and threshold distance 132.

The corresponding description below describes the operational flow of the system 300 for implementing the lane bias maneuver 130 when the autonomous vehicle 502 is approaching a curved road 302.

Operational Flow for Implementing the Lane Bias Maneuver to Negotiate a Curved Road The operational flow of the system 300 begins when the control device 550 may determine that the autonomous vehicle 502 is approaching a curved road 302.

In some embodiments, the control device 550 may determine that the autonomous vehicle 502 is approaching a curved road 302 based on analyzing the map data 114. The map data 114 is described in FIG. 1. For example, the map data 114 may include a virtual map of a city in which the autonomous vehicle 502 is driving. The map data 114 may include one or more roads ahead of the autonomous vehicle 502. The control device 550 may implement data processing algorithms, such as image processing algorithms to analyze the map data 114 to determine a shape of one or more roads ahead of the autonomous vehicle 502.

In some embodiments, the control device 550 may determine that the autonomous vehicle 502 is approaching the curved road 302 based on sensor data 314. In this process, the control device 550 may receive sensor data 314 from the sensors 546 of the autonomous vehicle 502, where the sensor data 314 describes the environment around the autonomous vehicle 502. The sensor data 314 may include data that indicates a set of locations of lane markers 306 on the curved road 302. The control device 550 may implement the object detection machine learning module 166 to process the sensor data 314 and determine the set of locations of the lane markers 306 from the sensor data 314. The control device 550 may determine that the autonomous vehicle 502 is approaching the curved road 302 based on determining that the set of locations of the lane markers 306 follows a curved line.

Now that the control device 550 has determined that the autonomous vehicle 502 is approaching the curved road 302, the control device 550 may determine a distance to drive the autonomous vehicle 502 off-center from the centerline of the curved lane 304 to perform the lane bias maneuver 130. To this end, the control device 550 may determine the total lane bias adjustment amount 320.

To determine the total lane bias adjustment amount 320, the control device 550 combines the first lane bias adjustment amount 330 and the second lane bias adjustment amount 340. The first lane bias adjustment amount 330 may be associated with the road curvature 328. The second lane bias adjustment amount 340 may be associated with the trailer angle 342. The control device 550 may instruct the autonomous vehicle 502 to perform the lane bias maneuver 130, where the lane bias maneuver 130 comprises driving the autonomous vehicle 502 off-center in a curved lane currently traveled by the autonomous vehicle 502 based on the total lane bias adjustment amount 320.

The corresponding description below described calculating the first lane bias adjustment amount 330 and the second lane bias adjustment amount 340.

Calculating a First Lane Bias Adjustment Amount Associated with a Road Curvature In some embodiments, in calculating the first lane bias adjustment amount 330, the trailer angle 342 is represented to be zero. As can be seen in FIG. 3, in calculating the first lane bias adjustment amount 330, the cab 316 and the trailer 318 of the autonomous vehicle 502 are substantially aligned with each other such that the trailer angle 342 between the cab 316 and the trailer 318 of the autonomous vehicle 502 is zero.

To determine the first lane bias adjustment amount 330, the control device 550 may determine a road radius 322 of the curved road 302. In some embodiments, the control device 550 may determine the road radius 322 from the map data 114. In this process, the control device 550 may determine a virtual circle 324 on the map data 114 such that the curved road 302 is a part of a circumference of the virtual circle 324. In other words, the centerline of the road 302 may be a part of the circumference of the virtual circle 324.

The control device 550 may determine the road radius 322 of the curved road 302 by calculating a distance between the center of the virtual circle 324 and a point 332 where the cab 316 of the autonomous vehicle 502 meets the trailer 318 of the autonomous vehicle 502. The control device 550 calculates the first lane bias adjustment amount 330 associated with the road curvature 328 using the road radius 322 and a trailer length 326 as described below. The trailer length 326 may be provided to the control device 550 in the software instructions 312.

In some embodiments, the control device 550 may calculate the first lane bias adjustment amount 330 according to an Equation (1).

$$\text{First lane bias adjustment value} = \left(\text{road radius}^2 - \text{trailer length}^2\right)^{1/2} - \text{road radius} \quad \text{Equation (1)}$$

The trailer length in Equation (1) is the trailer length 326 which is the length of the trailer 318.

In some embodiments, the control device 550 may adjust a sign of the first lane bias adjustment amount 330 based on a direction of the road curvature 328 and/or a direction of the first lane bias adjustment amount 330. As can be inferred from Equation (1), the calculated first lane bias adjustment amount 330 using the Equation (1) will always be positive. However, the sign of the first lane bias adjustment amount 330 may need to be adjusted based on the direction of the road curvature 328 and/or the direction of the first lane adjustment amount 330.

In the example situation illustrated in FIG. 3, it is assumed that if the road curvature 328 is to the left direction, the sign associated with the road curvature 328 is positive; and if the road curvature 328 is to the right direction, the sign associated with the road curvature 328 is negative. Further, it is assumed that if the first lane bias adjustment amount 330 is to the left direction, the sign of the first lane bias adjustment amount 330 is negative; and if the first lane bias adjustment amount 330 is to the right direction, the sign of the first lane bias adjustment amount 330 is positive.

In this example, the first lane bias adjustment amount 330 is to the left direction because the middle-end point of the trailer 318 is on the right side of the centerline of the lane 304. Thus, the sign of the first lane bias adjustment amount 330 is negative. Thus, in this example situation where the direction of the road curvature 328 is to the left and the direction of the first lane bias adjustment amount 330 is to the left, the first lane bias adjustment amount 330 with the adjusted sign may be calculated according to an Equation (2).

$$\text{First lane bias adjustment value with the adjustment sign} = \left(\left(\text{road raius}^2 - \text{trailer length}^2\right)^{1/2} - \text{road radius}\right) \times \text{sign}(-\text{road curvature}) \quad \text{Equation (2)}$$

The sign (road curvature) in Equation (2) indicates a sign associated with the road curvature 328.

Calculating the Second Lane Bias Adjustment Amount Associated with the Trailer Angle In some embodiments, in calculating the second lane bias adjustment amount 340, the road 302 is represented to be straight. As can be seen in FIG. 3, in calculating the second lane bias adjustment amount 340, the autonomous vehicle 502 is assumed to be on a straight line 348. The straight line 348 may be the centerline of a road that is assumed to be straight.

To calculate the second lane bias adjustment amount 340, the control device 550 may determine a trailer angle 342 between the trailer 318 and the cab 316. The control device 550 may determine the trailer angle 342 from sensor data 314 received from a sensor 546 that may be configured to measure the trailer angle 342 between the trailer 318 and the cab 316 by measuring mechanical rotations and converting them into a scaled electrical signal. The control device 550 calculates the second lane bias adjustment amount 340 associated with the trailer angle 342 using the trailer angle 342 and the trailer length 326, as described below.

In some embodiments, the control device 550 may calculate the second lane bias adjustment amount 340 according to an Equation (3).

$$\text{Second lane bias adjustment value} = \text{trailer length} \times \sin(\text{trailer angle}) \quad \text{Equation (3)}$$

In some embodiments, the control device 550 may adjust a sign of the second lane bias adjustment amount 340 based on a direction of the trailer angle 342 and/or a direction of the second lane bias adjustment amount 340.

The sign of the trailer angle 342 may depend on which direction the trailer 318 is diverting from the straight line 348. For example, if the trailer 318 swings to the left direction, a sign associated with the trailer angle 342 is negative; and if the trailer 318 swings to the right direction, the sign associated with the trailer angle 342 is positive. Also, if the second lane bias adjustment amount 340 is to the left direction, the sign of the second lane bias adjustment amount 340 is negative; and if the second lane bias adjustment amount 340 is to the right direction, the sign of the second lane bias adjustment amount 340 is positive.

In the example situation illustrated in FIG. 3, the direction of the second lane bias adjustment amount 340 is to the right because the trailer 318 is diverted to the left direction. Thus, the right direction of the second lane bias adjustment amount 340 means that the sign of the second lane bias adjustment amount 340 is positive.

Thus, in this example where the direction of the trailer angle 342 is to the left and the direction of the second lane bias adjustment amount 340 is to the right, the control device 550 may calculate the second lane bias adjustment amount 340 with the adjusted sign according to an Equation (4).

$$\text{Second lane bias adjustment value with the assigned sign} = -\text{trailer length} \times \sin(\text{trailer angle}) \quad \text{Equation (4)}$$

As described above, each of the first lane bias adjustment amount 330 and the second lane bias adjustment amount 340 may be toward the left or right direction and is associated with a sign.

If a lane bias direction is to the left, the sign for that lane bias adjustment amount is negative; and if a lane bias direction is to the right, the sign of that lane bias adjustment amount is positive. The direction and amount of the total lane bias adjustment amount 320 may depend on the sign and the amount of each of the first lane bias adjustment amount 330 and the second lane bias adjustment amount 340.

In other words, the direction and amount of the total lane bias adjustment amount 320 may depend on which of the first lane bias adjustment amount 330 or the second lane bias adjustment amount 340 has more effect on the autonomous vehicle 502. For example, if the first lane bias adjustment amount 330 has a negative sign (i.e., toward the left direction), the second lane bias adjustment amount 340 has a positive sign (i.e., toward the right direction), and the first lane bias adjustment amount 330 is larger than the second lane bias adjustment amount 340, the total lane bias adjustment amount 320 will be negative (i.e., toward the left direction).

Performing the Lane Bias Maneuver

The control device 550 calculates the total lane bias adjustment amount 320 by combining the first lane bias adjustment amount 330 and the second lane bias adjustment amount 340.

Once the total lane bias adjustment amount 320 is calculated, the control device 550 may instruct the autonomous vehicle 502 to perform the lane bias maneuver 130 using the total lane bias adjustment amount 320. In this maneuver, the control device 550 drives the autonomous vehicle 502 off-center from the centerline of the curved lane 304 based on the calculated total lane bias adjustment amount 320 so that the autonomous vehicle 502 does not invade the side lanes.

In cases where the autonomous vehicle 502 encounters a vehicle 310 along the curved road 302, the control device 550 may account for the keeping a safe distance from the vehicle 310 in addition to accounting for the lane bias adjustment amounts 330 and/or 340 associated with the road curvature 328 and/or the trailer angle 342.

To this end, the control device 550 may determine the lane bias amount 110 to keep a safe distance from the vehicle 310, i.e., until the distance between the autonomous vehicle 502 and the vehicle 310 is at least equal to the threshold distance 132, similar to that described in FIGS. 1 and 2. The control device 550 may also determine the total lane bias adjustment amount 320, similar to that described above in FIG. 3. The control device 550 may combine or add the total lane bias adjustment amount 320 with the lane bias amount 110 described in FIGS. 1 and 2 to determine the final lane bias amount 350 to drive the autonomous vehicle 502 off-center from a centerline of the lane 304.

If there are no vehicles 310 on the curved road 302, the total lane bias adjustment amount 320 may be equal to the final lane bias amount 350.

An example scenario where the autonomous vehicle 502 encounters a vehicle 310 on a curved road 302 is described below.

Encountering a Vehicle on a Curved Road

In an example scenario, assume that the autonomous vehicle 502 encounters a vehicle 310 while traveling on a curved road 302. In such cases, the control device 550 may calculate the lane bias amount 110 for keeping at least the threshold distance 132 from the vehicle 310, similar to that described in FIGS. 1 and 2.

The control device 550 may also calculate the total lane bias adjustment amount 320 by calculating and combining the first lane bias adjustment amount 330 and the second lane bias adjustment amount 340, similar to that described above. The control device 550 may determine the final lane bias amount 350 by combining the lane bias amount 110 and the total lane bias adjustment amount 320.

In the example of FIG. 3, if the autonomous vehicle 502 encounters the vehicle 310a on the outer side of the curved road 302, the control device 550 may combine the lane bias amount 110 to the total lane bias adjustment amount 320 to calculate the final lane bias amount 350.

If the autonomous vehicle 502 encounters the vehicle 310b on the inner side of the curved road 302, the control device 550 may determine not to combine the lane bias amount 110 to the total lane bias adjustment amount 320 and only use the total lane bias adjustment amount 320 to drive the autonomous vehicle 502 off-center from the lane 304. One reason for determining not to combine the lane bias amount 110 to the total lane bias adjustment amount 320 is to not reduce a distance between the autonomous vehicle 502 and the vehicle 310b and not to reduce the final lane bias amount 350.

Performing the Lane Bias Maneuver on a Straight Road

In some embodiments, the control device 550 may determine whether to instruct the autonomous vehicle 502 to perform the lane bias maneuver 130 while traveling on a straight road. The control device 550 may determine that the autonomous vehicle 502 is traveling along a straight road by analyzing the map data 114 and/or sensor data 314, similar to that described above with respect to determining that the autonomous vehicle 502 is approaching the curved road 302. Thus, the control device 550 may determine that the first lane bias adjustment amount 330 is zero because the road radius 322 is substantially large, such as more than a threshold distance, e.g., 1000 meters.

In some cases, the wind might push the trailer 318 of the autonomous vehicle 502 to divert from the centerline of a straight road. In such cases, the control device 550 may detect that wind is causing the trailer 318 of the autonomous vehicle 502 to divert from a straight line. The control device 550 may determine that wind is causing the trailer 318 of the autonomous vehicle 502 to divert from the straight line based on sensor data 314 received from the sensors 546 that indicates the trailer angle 342 is more than zero. In response, the control device 550 may determine the trailer angle 342 associated with the wind from sensor data 314 received from a sensor 546 that may be configured to measure the trailer angle 342.

The control device 550 calculates the second lane bias adjustment amount 340 caused by the wind, similar to that described above using the Equations (3) and (4). Since the first lane bias adjustment amount 330 is determined to be zero, the control device 550 may determine that the total lane bias adjustment amount 320 is equal to the second lane bias adjustment amount 340.

Calculating the Total Lane Bias Adjustment Amount Using a Trailer Bias

In another embodiment, the control device 550 may calculate the final lane bias amount 350 as described below.

In this embodiment, the control device 550 may calculate a trailer bias amount 352 according to an Equation (5):

$$\text{trailer bias} = \left(\text{road radius}^2 + \text{trailer length}^2 - 2 \times \text{road radius} \times \text{trailer lenght} \times \cos\left(\frac{\pi}{2} - \text{trailer angle}\right)\right)^{1/2} - \text{road radius} \quad \text{Equation (5)}$$

The calculated trailer bias amount 352 may be positive or negative. When the trailer bias amount 352 is positive, it means that the trailer 318 is biased or diverted toward the outer side of the curved road 302. When the trailer bias amount 352 is negative, it means that the trailer 318 is biased or diverted toward the inner side of the curved road 302. For each of the trailer angle 342, the road curvature 328, and the final lane bias amount 350, the positive sign means the left direction, and the negative sign means the right direction.

Thus, the direction or sign of the trailer bias amount 352 may need to be adjusted to align with the correct lane bias direction. Thus, the control device 550 may calculate the final lane bias amount 350 by combining the lane bias amount 110 with the trailer bias amount 352 with the adjusted sign.

The process of adjusting the sign of the trailer bias amount 352 is described below. In some cases, the autonomous vehicle 502 may encounter a vehicle 310 on either side and on a curved road 302, where the curvature of the curved road 302 may be toward left or right direction. For example, the autonomous vehicle 502 may encounter: 1) a road with a left curvature and the vehicle 310 may be on the right side of the autonomous vehicle 502; 2) a road with a left curvature and the vehicle 310 may be on the left side of the autonomous vehicle 502; 3) a road with a right curvature and the vehicle 310 may be on the left side of the autonomous vehicle 502; and 4) a road with a right curvature and the vehicle 310 may be on the right side of the autonomous vehicle 502.

The control device 550 may determine the direction and sign of each of the trailer angle 342, the curvature, the trailer bias amount 352, and the final lane bias amount 350, as illustrated in the Table 1 below.

TABLE 1

Example scenarios where the autonomous vehicle 502 encounters a vehicle 310 on a curved road 302.

|  | Left curve, trailer 318 is biased to outer side, vehicle 310 is on right, thus, autonomous vehicle 502 is lane biased to left | Left curve, trailer 318 is biased to inner side, vehicle 310 is on left, thus, autonomous vehicle 502 is lane biased to right | Right curve, trailer 318 is biased to outer side, vehicle 310 is on left, thus, autonomous vehicle 502 is lane biased to right | Right curve, trailer 318 is biased to inner side, vehicle 310 is on right, thus, autonomous vehicle 502 is lane biased to left |
| --- | --- | --- | --- | --- |
| Trailer angle 342 | − (trailer 318 swings to left side) | − (trailer 318 swings to left side) | + (trailer 318 swings to right side) | + (trailer 318 swings to right side) |
| Road curvature 328 | + (left curve) | + (left curve) | − (right curve) | − (right curve) |
| Direction of trailer bias amount 352 | + (trailer 318 biased to outer side) | − (trailer 318 biased to inner side) | + (trailer 318 biased to outer side) | − (trailer 318 biased to inner side) |
| Direction of final lane bias amount 350 | − (autonomous vehicle 502 is lane biased to the left) | + (autonomous vehicle 502 is lane biased to the right) | + (autonomous vehicle 502 is lane biased to the right) | − (autonomous vehicle 502 is lane biased to the left) |

As can be seen from the Table 1, for left curves, the direction of the trailer bias amount 352 has the opposite sign compared to the direction of the lane bias amount 110, while for the right curves, the direction of the trailer bias amount 352 has the same sign as the direction of the lane bias amount 110. Thus, the control device 550 may reverse the sign of the trailer bias amount 352 if it is going through a left curve. This can be done by multiplying the sign of the trailer angle 342 with the trailer bias amount 352.

In some cases, the trailer angle 342 may be too small, for example, less than a threshold degree, e.g., less than five degrees, four degrees, etc. In such cases, the sign of the road curvature 328 (opposite to the trailer angle 342) may be used to adjust the sign of the trailer bias amount 352.

In another use case, assume that the autonomous vehicle 502 is traveling along a straight road, and the trailer 318 is biased or diverted from the straight line due to road banks (roll angles) or wind. In such cases, since the road radius 322 is very large (e.g., more than a threshold amount), the trailer bias amount 352 will always be negative (inner side compared to the large circle associated with the large road radius 322).

In such cases, the control device 550 may determine the direction and sign of each of the trailer angle 342, the curvature, the trailer bias amount 352, and the final lane bias amount 350, as illustrated in the Table 2 below.

TABLE 2

| Example scenarios where the autonomous vehicle 502 encounters a vehicle 310 on a straight road. | | |
|---|---|---|
| | Straight road, trailer 318 biased to left side, vehicle 310 on left, thus the autonomous vehicle 502 is lane biased to right | Straight road, trailer 318 biased to right side, vehicle 310 on right, thus autonomous vehicle 502 is lane biased to left |
| Trailer angle 342 | − (trailer 318 swings to left side) | + (trailer 318 swings to right side) |
| Road curvature 328 | N/A | N/A |
| Direction of trailer bias amount 352 | − (trailer 318 biased to inner side) | − (trailer 318 biased to inner side) |
| Direction of final lane bias amount 350 | + (autonomous vehicle 502 lane bias to the right) | − (autonomous vehicle 502 lane bias to the left) |

As can be seen from the Table 2, the road curvature 328 is not usable because the road is straight. As further can be seen from the Table 2, the trailer bias amount 352 has the opposite sign compared to the final lane bias amount 350 if the trailer 318 swings to the left side, while the trailer bias amount 352 has the same sign as the final lane bias amount 350 if the trailer 318 swings to the right direction. In this case, the control device 550 may multiply the sign of the trailer angle 342 with the trailer bias amount 352 to adjust the sign of the trailer bias amount 352.

In an example scenario, assume that the road radius 322 (or the turning radius) is 620 meters (m), and the average of the trailer angle 342 is 0.01 radian (rad) with an average deviation or spike up to 0.02 rad. In this example, the average of the trailer bias amount 352 may be 0.0 m with an average deviation or spike up to −0.14 m. In this example, the negative value means the inner side. Thus, the trailer bias amount 352 is on the middle of the lane with some oscillations or deviations to the inner side.

In another example scenario, assume that the road radius 322 (or the turning radius) is 502 m, and the average of the trailer angle 342 is 0.018 rad with an average deviation or spike up to −0.3 rad. The deviations or spikes could be caused by the wind, control adjustments to the autonomous vehicle 502, and/or road bumps, but the trailer bias amount 352 is toward the inner side.

The difference between biasing toward the inner and outer sides of the curved road 302 may be explained by the different roll angles. The inner side of the road has a large roll angle which may lead the trailer 318 to bias toward the inner side.

In some cases, the trailer angle 342 may be too small to be measured due to a shape of the road curvature 328, such as in sharp curves. In such cases, the road radius 322 may be at least 1000 m. Thus, the trailer bias amount 352 may be smaller than 0.15 m. Here, the trailer bias amount 352 is to the outer side (upon ignoring the very small trailer angle 342). One possible reason is that such a curved road may be flat and the roll angle is much smaller than the curved angle.

In some embodiments, the trailer bias amount 352 may be affected by the speed of the autonomous vehicle 502, the road curvature 328 (or the turning radius), roll angle, and/or wind that is going across the autonomous vehicle 502. To reduce the complexity of calculating the trailer bias amount 352, the trailer angle 342 may be used. If the turning radius is larger than 1000 m, the trailer bias amount 352 may be calculated to be less than 0.15 m. This amount of bias is smaller than the lateral error range than is preconfigured in the control device 550. Thus, it may not be noticeable by the control device 550.

In some embodiments, the control device 550 may be configured to reduce signal noise and self-existing control adjustments and driving behaviors in calculating the total lane bias adjustment amount 320 and/or the final lane bias amount 350. In this operation, the control device 550 may implement smoothing filters to smooth the instruction signal that indicates to perform the lane bias maneuver 130, thereby reducing the signal noise and self-existing control adjustments and driving behaviors. In some embodiments, the control device 550 may use a digital filter, such as a moving average filter, a finite impulse response filter, an infinite impulse response filter, and/or the like to reduce the noise or deviations in calculating the trailer angle 342.

In certain embodiments, the control device 550 may perform a similar operation with respect to determining a lateral distance (138a-c in FIG. 1) between the autonomous vehicle 502 and a vehicle 310a and/or vehicle 310b, compare the lateral distance with a threshold distance (132 in FIG. 1) to determine whether or not the lateral distance is less than the threshold distance. If it is determined that the lateral distance is less than the threshold distance, the control device 550 may instruct the autonomous vehicle to perform the lane bias maneuver 130.

In certain embodiments, the control device 550 may perform similar operations when encountering a curved road 302, similar to that described in FIGS. 1 and 2 when encountering a straight road 102, and vice versa. For example, the control device 550 may adjust one or more operations for navigating the autonomous vehicle 502 described herein according to the shape of the road to achieve a more optimal and safe navigation path for the autonomous vehicle 502, surrounding vehicles, and pedestrians.

In certain embodiments, the control device 550 may perform a similar operation with respect to determining a lateral distance (138a-c in FIG. 1) between the autonomous vehicle 502 and a vehicle 310a and/or vehicle 310b, compare the lateral distance with a threshold distance (132 in FIG. 1) to determine whether or not the lateral distance is less than the threshold distance. If it is determined that the lateral distance is less than the threshold distance, the control device 550 may instruct the autonomous vehicle to perform the lane bias maneuver 130.

In certain embodiments, the control device 550 may perform similar operations when encountering a curved road 302, similar to that described in FIGS. 1 and 2 when encountering a straight road 102, and vice versa. For example, the control device 550 may adjust one or more operations for navigating the autonomous vehicle 502 described herein according to the shape of the road to achieve a more optimal and safe navigation path for the autonomous vehicle 502, surrounding vehicles, and pedestrians.

The embodiments, examples, and operations described in the present disclosure are not exclusive from one another. In certain embodiments, any and any combination of embodiments, examples, and operations may be implemented in conjunction to one another as a situation encountered by an autonomous vehicle 502 requires.

Example Method for Implementing a Lane Bias Maneuver to Negotiate a Curved Road

FIG. 4 illustrates an example flowchart of a method 400 for implementing a lane bias maneuver 130 to negotiate a curved road. Modifications, additions, or omissions may be made to method 400. Method 400 may include more, fewer, or other operations. For example, operations may be performed in parallel or in any suitable order. While at times discussed as the autonomous vehicle 502, control device 550, or components of any of thereof performing operations, any suitable system or components of the system may perform one or more operations of the method 400. For example, one or more operations of method 400 may be implemented, at least in part, in the form of software instructions 312 and processing instructions 580, respectively, from FIGS. 3 and 5, stored on non-transitory, tangible, machine-readable media (e.g., memory 126 and data storage 590, respectively, from FIGS. 3 and 5) that when run by one or more processors (e.g., processors 122 and 570, respectively, from FIGS. 3 and 5) may cause the one or more processors to perform operations 402-418.

Method 400 begins at operation 402 where the control device 550 may determine whether the autonomous vehicle 502 is approaching a curved road 302. In this process, the control device 550 may determine whether the autonomous vehicle 502 is approaching a curved road 302 based on analyzing the map data 114 and/or sensor data 314, similar to that described in FIG. 3. If the control device 550 determines that the autonomous vehicle 502 is approaching a curved road 302, method 400 may proceed to operation 404. Otherwise, method 400 may proceed to operation 416.

At operation 404, the control device 550 may determine a road radius 322 of the curved road 302, similar to that described in FIG. 3.

At operation 406, the control device 550 may calculate a first lane bias adjustment amount 330 associated with a road curvature 328 of the curved road 302 based on the road radius 322. In this process, the control device 550 may calculate the first lane bias adjustment amount 330 according to Equations (1) and (2) described in FIG. 3.

At operation 408, the control device 550 may determine a trailer angle 342 between the trailer 318 and the cab 316 of the autonomous vehicle 502, similar to that described in FIG. 3.

At operation 410, the control device 550 may calculate a second lane bias adjustment amount 340 associated with the trailer angle 342 based on the trailer angle 342. In this process, the control device 550 may calculate the second lane bias adjustment amount 340 according to Equations (3) and (4), similar to that described in FIG. 3.

At operation 412, the control device 550 may calculate a total lane bias adjustment amount 320 by combining the first and second lane bias adjustment amounts 330 and 340.

At operation 414, the control device 550 may combine the total lane bias adjustment value 320 with an original lane bias amount 110. The control device 550 may instruct the autonomous vehicle 502 to perform a lane bias maneuver 130 based on the total lane bias adjustment amount 320 and the original lane bias amount 110. The lane bias maneuver 130 comprises driving the autonomous vehicle 502 off-center in a curved lane 304 currently traveled by the autonomous vehicle 502 based on the total lane bias adjustment amount 320 and the original lane bias amount 110.

In cases where the autonomous vehicle 502 is on a straight road, the control device 550 may perform the operations 416-420 described below.

At operation 416, the control device 550 may determine whether the trailer angle 342 between the cab 316 and the trailer 318 of the autonomous vehicle 502 is more than zero. For example, the control device 550 may determine whether the trailer angle 342 is more than zero if sensor data 314 comprises data that indicates the trailer angle 342 is more than zero. In this process, the control device 550 may determine whether wind going across the autonomous vehicle 502 pushing the trailer 318 of the autonomous vehicle to left or right and causing the trailer angle 342 between the cab 316 and the trailer 318 of the autonomous vehicle 502 to become more than zero, similar to that described in FIG. 3. If the control device 550 determines that the trailer angle 342 is more than zero, method 400 may proceed to operation 418. Otherwise, method 400 may proceed to operation 420.

At operation 418, the control device 550 may determine that the first lane bias adjustment value 330 is zero. In response, method 200 may proceed to 414.

At operation 420, the control device 550 may determine that the total lane bias adjustment value 320 is zero. In one embodiment, the control device 750 may determine not to instruct the autonomous vehicle 502 to perform the lane bias maneuver 130 if the lane bias amount 110 and the total lane bias adjustment value 320 are zero.

Example Autonomous Vehicle and its Operation

FIG. 5 shows a block diagram of an example system 500 in which autonomous driving operations can be performed. As shown in FIG. 5, the autonomous vehicle 502 may be a semi-trailer truck. The system 500 may include several subsystems and components that can generate and/or deliver one or more sources of information/data and related services to the in-vehicle control computer 550 that may be located in an autonomous vehicle 502. The in-vehicle control computer 550 can be in data communication with a plurality of vehicle subsystems 540, all of which can be resident in the autonomous vehicle 502. A vehicle subsystem interface 560 may be provided to facilitate data communication between the in-vehicle control computer 550 and the plurality of vehicle subsystems 540. In some embodiments, the vehicle subsystem interface 560 can include a controller area network (CAN) controller to communicate with devices in the vehicle subsystems 540.

The autonomous vehicle 502 may include various vehicle subsystems that support the operation of autonomous vehicle 502. The vehicle subsystems 540 may include a vehicle drive subsystem 542, a vehicle sensor subsystem 544, a vehicle control subsystem 548, and/or network communication subsystem 592. The components or devices of the vehicle drive subsystem 542, the vehicle sensor subsystem 544, and the vehicle control subsystem 548 shown in FIG. 5 are examples. The autonomous vehicle 502 may be configured as shown or any other configurations.

The vehicle drive subsystem 542 may include components operable to provide powered motion for the autonomous vehicle 502. In an example embodiment, the vehicle drive subsystem 542 may include an engine/motor 542*a*, wheels/tires 542*b*, a transmission 542*c*, an electrical subsystem 542*d*, and a power source 542*e*.

The vehicle sensor subsystem 544 may include a number of sensors 546 configured to sense information about an environment or condition of the autonomous vehicle 502. The vehicle sensor subsystem 544 may include one or more cameras 546*a* or image capture devices, a radar unit 546*b*, one or more temperature sensors 546*c*, a wireless communication unit 546*d* (e.g., a cellular communication transceiver), an inertial measurement unit (IMU) 546*e*, a laser range finder/LiDAR unit 546*f*, a Global Positioning System (GPS) transceiver 546*g*, and/or a wiper control system 546*h*. The vehicle sensor subsystem 544 may also include sensors configured to monitor internal systems of the autonomous vehicle 502 (e.g., an $O_2$ monitor, a fuel gauge, an engine oil temperature, etc.).

The IMU 546*e* may include any combination of sensors (e.g., accelerometers and gyroscopes) configured to sense position and orientation changes of the autonomous vehicle 502 based on inertial acceleration. The GPS transceiver 546*g* may be any sensor configured to estimate a geographic location of the autonomous vehicle 502. For this purpose, the GPS transceiver 546*g* may include a receiver/transmitter operable to provide information regarding the position of the autonomous vehicle 502 with respect to the Earth. The radar unit 546*b* may represent a system that utilizes radio signals to sense objects within the local environment of the autonomous vehicle 502. In some embodiments, in addition to sensing the objects, the radar unit 546*b* may additionally be configured to sense the speed and the heading of the objects proximate to the autonomous vehicle 502. The laser range finder or LiDAR unit 546*f* may be any sensor configured to use lasers to sense objects in the environment in which the autonomous vehicle 502 is located. The cameras 546*a* may include one or more devices configured to capture a plurality of images of the environment of the autonomous vehicle 502. The cameras 546*a* may be still image cameras or motion video cameras.

The vehicle control subsystem 548 may be configured to control the operation of the autonomous vehicle 502 and its components. Accordingly, the vehicle control subsystem 548 may include various elements such as a throttle and gear selector 548*a*, a brake unit 548*b*, a navigation unit 548*c*, a steering system 548*d*, and/or an autonomous control unit 548*e*. The throttle and gear selector 548*a* may be configured to control, for instance, the operating speed of the engine and, in turn, control the speed of the autonomous vehicle 502. The throttle and gear selector 548*a* may be configured to control the gear selection of the transmission. The brake unit 548*b* can include any combination of mechanisms configured to decelerate the autonomous vehicle 502. The brake unit 548*b* can slow the autonomous vehicle 502 in a standard manner, including by using friction to slow the wheels or engine braking. The brake unit 548*b* may include an anti-lock brake system (ABS) that can prevent the brakes from locking up when the brakes are applied. The navigation unit 548*c* may be any system configured to determine a driving path or route for the autonomous vehicle 502. The navigation unit 548*c* may additionally be configured to update the driving path dynamically while the autonomous vehicle 502 is in operation. In some embodiments, the navigation unit 548*c* may be configured to incorporate data from the GPS transceiver 546*g* and one or more predetermined maps so as to determine the driving path for the autonomous vehicle 502. The steering system 548*d* may represent any combination of mechanisms that may be operable to adjust the heading of autonomous vehicle 502 in an autonomous mode or in a driver-controlled mode.

The autonomous control unit 548*e* may represent a control system configured to identify, evaluate, and avoid or otherwise negotiate potential obstacles or obstructions in the environment of the autonomous vehicle 502. In general, the autonomous control unit 548*e* may be configured to control the autonomous vehicle 502 for operation without a driver or to provide driver assistance in controlling the autonomous vehicle 502. In some embodiments, the autonomous control unit 548*e* may be configured to incorporate data from the GPS transceiver 546*g*, the radar unit 546*b*, the LiDAR unit 546*f*, the cameras 546*a*, and/or other vehicle subsystems to determine the driving path or trajectory for the autonomous vehicle 502.

The network communication subsystem 592 may comprise network interfaces, such as routers, switches, modems, and/or the like. The network communication subsystem 592 may be configured to establish communication between the autonomous vehicle 502 and other systems including an oversight server that may be configured to oversee operations of the autonomous vehicles 502. The network communication subsystem 592 may be further configured to send and receive data from and to other systems.

Many or all of the functions of the autonomous vehicle 502 can be controlled by the in-vehicle control computer 550. The in-vehicle control computer 550 may include at least one data processor 570 (which can include at least one microprocessor) that executes processing instructions 580 stored in a non-transitory computer-readable medium, such as the data storage device 590 or memory. The in-vehicle control computer 550 may also represent a plurality of computing devices that may serve to control individual components or subsystems of the autonomous vehicle 502 in a distributed fashion. In some embodiments, the data storage device 590 may contain processing instructions 580 (e.g., program logic) executable by the data processor 570 to perform various methods and/or functions of the autonomous vehicle 502, including those described with respect to FIGS. 1-7.

The data storage device 590 may contain additional instructions as well, including instructions to transmit data to, receive data from, interact with, or control one or more of the vehicle drive subsystem 542, the vehicle sensor subsystem 544, and the vehicle control subsystem 548. The in-vehicle control computer 550 can be configured to include a data processor 570 and a data storage device 590. The in-vehicle control computer 550 may control the function of the autonomous vehicle 502 based on inputs received from various vehicle subsystems (e.g., the vehicle drive subsystem 542, the vehicle sensor subsystem 544, and the vehicle control subsystem 548).

FIG. 6 shows a system 600 for providing precise autonomous driving operations. The system 600 may include several modules that can operate in the in-vehicle control computer 550, as described in FIG. 5. The in-vehicle control computer 550 may include a sensor fusion module 602 shown in the top left corner of FIG. 6, where the sensor fusion module 602 may perform at least four image or signal processing operations. The sensor fusion module 602 can obtain images from cameras located on an autonomous vehicle to perform image segmentation 604 to detect the presence of moving objects (e.g., other vehicles, pedestrians, etc.) and/or static obstacles (e.g., stop sign, speed bump, terrain, etc.) located around the autonomous vehicle. The sensor fusion module 602 can obtain LiDAR point cloud data item from LiDAR sensors located on the autonomous vehicle to perform LiDAR segmentation 606 to detect the presence of objects and/or obstacles located around the autonomous vehicle.

The sensor fusion module 602 can perform instance segmentation 608 on image and/or point cloud data items to identify an outline (e.g., boxes) around the objects and/or obstacles located around the autonomous vehicle. The sensor fusion module 602 can perform temporal fusion 610 where objects and/or obstacles from one image and/or one frame of point cloud data item are correlated with or associated with objects and/or obstacles from one or more images or frames subsequently received in time.

The sensor fusion module 602 can fuse the objects and/or obstacles from the images obtained from the camera and/or point cloud data item obtained from the LiDAR sensors. For example, the sensor fusion module 602 may determine based on a location of two cameras that an image from one of the cameras comprising one half of a vehicle located in front of the autonomous vehicle is the same as the vehicle captured by another camera. The sensor fusion module 602 may send the fused object information to the interference module 646 and the fused obstacle information to the occupancy grid module 660. The in-vehicle control computer may include the occupancy grid module 660 which can retrieve landmarks from a map database 658 stored in the in-vehicle control computer. The occupancy grid module 660 can determine drivable areas and/or obstacles from the fused obstacles obtained from the sensor fusion module 602 and the landmarks stored in the map database 658. For example, the occupancy grid module 660 can determine that a drivable area may include a speed bump obstacle.

Below the sensor fusion module 602, the in-vehicle control computer 550 may include a LiDAR-based object detection module 612 that can perform object detection 616 based on point cloud data item obtained from the LiDAR sensors 614 located on the autonomous vehicle. The object detection 616 technique can provide a location (e.g., in 3D world coordinates) of objects from the point cloud data item. Below the LiDAR-based object detection module 612, the in-vehicle control computer may include an image-based object detection module 618 that can perform object detection 624 based on images obtained from cameras 620 located on the autonomous vehicle. The object detection 618 technique can employ a deep machine learning technique 624 to provide a location (e.g., in 3D world coordinates) of objects from the image provided by the camera 620.

The radar 656 on the autonomous vehicle can scan an area in front of the autonomous vehicle or an area towards which the autonomous vehicle is driven. The radar data is sent to the sensor fusion module 602 that can use the radar data to correlate the objects and/or obstacles detected by the radar 656 with the objects and/or obstacles detected from both the LiDAR point cloud data item and the camera image. The radar data also may be sent to the interference module 646 that can perform data processing on the radar data to track objects by object tracking module 648 as further described below.

The in-vehicle control computer may include an interference module 646 that receives the locations of the objects from the point cloud and the objects from the image, and the fused objects from the sensor fusion module 602. The interference module 646 also receives the radar data with which the interference module 646 can track objects by object tracking module 648 from one point cloud data item and one image obtained at one time instance to another (or the next) point cloud data item and another image obtained at another subsequent time instance.

The interference module 646 may perform object attribute estimation 650 to estimate one or more attributes of an object detected in an image or point cloud data item. The one or more attributes of the object may include a type of object (e.g., pedestrian, car, or truck, etc.). The interference module 646 may perform behavior prediction 652 to estimate or predict motion pattern of an object detected in an image and/or a point cloud. The behavior prediction 652 can be performed to detect a location of an object in a set of images received at different points in time (e.g., sequential images) or in a set of point cloud data item received at different points in time (e.g., sequential point cloud data items). In some embodiments, the behavior prediction 652 can be performed for each image received from a camera and/or each point cloud data item received from the LiDAR sensor. In some embodiments, the interference module 646 can be performed (e.g., run or executed) to reduce computational load by performing behavior prediction 652 on every other or after every pre-determined number of images received from a camera or point cloud data item received from the LiDAR sensor (e.g., after every two images or after every three point cloud data items).

The behavior prediction 652 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the interference module 646 may assign motion pattern situational tags to the objects (e.g., "located at coordinates (x,y)," "stopped," "driving at 50 mph," "speeding up" or "slowing down"). The situation tags can describe the motion pattern of the object. The interference module 646 may send the one or more object attributes (e.g., types of the objects) and motion pattern situational tags to the planning module 662. The interference module 646 may perform an environment analysis 654 using any information acquired by system 600 and any number and combination of its components.

The in-vehicle control computer may include the planning module 662 that receives the object attributes and motion pattern situational tags from the interference module 646, the drivable area and/or obstacles, and the vehicle location and pose information from the fused localization module 626 (further described below).

The planning module 662 can perform navigation planning 664 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 664 may include determining an area next to the road where the autonomous vehicle can be safely parked in case of emergencies. The planning module 662 may include behavioral decision making 666 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 662 may perform trajectory generation 668 and select a trajectory from the set of trajectories determined by the navigation planning operation 664. The selected trajectory information may be sent by the planning module 662 to the control module 670.

The in-vehicle control computer may include a control module 670 that receives the proposed trajectory from the planning module 662 and the autonomous vehicle location and pose from the fused localization module 626. The control module 670 may include a system identifier 672. The control module 670 can perform a model-based trajectory refinement 674 to refine the proposed trajectory. For example, the control module 670 can apply filtering (e.g., Kalman filter) to make the proposed trajectory data smooth and/or to minimize noise. The control module 670 may perform the robust control 676 by determining, based on the refined proposed trajectory information and current location and/or pose of the autonomous vehicle, an amount of brake pressure to apply, a steering angle, a throttle amount to control the speed of the vehicle, and/or a transmission gear. The control module 670 can send the determined brake pressure, steering angle, throttle amount, and/or transmission gear to one or more devices in the autonomous vehicle to control and facilitate precise driving operations of the autonomous vehicle.

The deep image-based object detection 624 performed by the image-based object detection module 618 can also be used detect landmarks (e.g., stop signs, speed bumps, etc.) on the road. The in-vehicle control computer may include a fused localization module 626 that obtains landmarks detected from images, the landmarks obtained from a map database 636 stored on the in-vehicle control computer, the landmarks detected from the point cloud data item by the LiDAR-based object detection module 612, the speed and displacement from the odometer sensor 644 and the estimated location of the autonomous vehicle from the GPS/IMU sensor 638 (i.e., GPS sensor 640 and IMU sensor 642) located on or in the autonomous vehicle. Based on this information, the fused localization module 626 can perform a localization operation 628 to determine a location of the autonomous vehicle, which can be sent to the planning module 662 and the control module 670.

The fused localization module 626 can estimate pose 630 of the autonomous vehicle based on the GPS and/or IMU sensors 638. The pose of the autonomous vehicle can be sent to the planning module 662 and the control module 670. The fused localization module 626 can also estimate status (e.g., location, possible angle of movement) of the trailer unit based on (e.g., trailer status estimation 634), for example, the information provided by the IMU sensor 642 (e.g., angular rate and/or linear velocity). The fused localization module 626 may also check the map content 632.

FIG. 7 shows an exemplary block diagram of an in-vehicle control computer 550 included in an autonomous vehicle 502. The in-vehicle control computer 550 may include at least one processor 704 and a memory 702 having instructions stored thereupon (e.g., software instructions 128, 312, and processing instructions 580 in FIGS. 1, 3, and 5, respectively). The instructions, upon execution by the processor 704, configure the in-vehicle control computer 550 and/or the various modules of the in-vehicle control computer 550 to perform the operations described in FIGS. 1-7. The transmitter 706 may transmit or send information or data to one or more devices in the autonomous vehicle. For example, the transmitter 706 can send an instruction to one or more motors of the steering wheel to steer the autonomous vehicle. The receiver 708 may receive information or data transmitted or sent by one or more devices. For example, the receiver 708 may receive a status of the current speed from the odometer sensor or the current transmission gear from the transmission. The transmitter 706 and receiver 708 also may be configured to communicate with the plurality of vehicle subsystems 540 and the in-vehicle control computer 550 described above in FIGS. 5 and 6.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of the disclosure can be described in view of the following clauses, the features of which can be combined in any reasonable manner.

Clause 1. A system comprising:
a control device associated with an autonomous vehicle and comprising:
a memory configured to store sensor data associated with one or more objects on a road, wherein the sensor data is captured by at least one sensor associated with the autonomous vehicle; and
at least one processor operably coupled to the memory, and configured to at least:
detect a presence of a vehicle from the sensor data;
determine a lateral distance between the autonomous vehicle and the vehicle;

compare the lateral distance between the autonomous vehicle and the vehicle with a threshold distance from the autonomous vehicle; and determine, based at least in part upon the comparison between the lateral distance and the threshold distance, whether to instruct the autonomous vehicle to perform a lane bias maneuver, wherein the lane bias maneuver comprises driving the autonomous vehicle off center in a current lane traveled by the autonomous vehicle toward an opposite direction with respect to the vehicle until the lateral distance between the autonomous vehicle and the vehicle is at least equal to the threshold distance.

Clause 2. The system of Clause 1, wherein the at least one processor is further configured to at least determine a lane bias amount, wherein the lane bias amount is a distance that the autonomous vehicle moves off center in the current lane until the lateral distance between the autonomous vehicle and the vehicle is at least equal to the threshold distance.

Clause 3. The system of Clause 1, wherein the at least one processor is further configured to at least:
determine a location of a lane marker between the autonomous vehicle and the vehicle;
determine that the vehicle is intruding into the current lane in response to determining that the lateral distance between the autonomous vehicle and the vehicle is less than a distance between the autonomous vehicle and the lane marker;
determine how much of the current lane is intruded by the vehicle;
determine an available distance in the current lane on the other side of the autonomous vehicle compared to where the vehicle is detected;
compare the intruded distance in the current lane by the vehicle with the available distance in the current lane on the other side of the autonomous vehicle;
determine whether there is enough available distance in the current lane on the other side of the autonomous vehicle to perform the lane bias maneuver based at least in part the comparison between the intruded distance of the current lane by the vehicle with the available distance on the other side of the autonomous vehicle;
in response to determining that there is enough available distance in the current lane on the other side of the autonomous vehicle to perform the lane bias maneuver, instruct the autonomous vehicle to perform the lane bias maneuver; and
in response to determining that there is not enough available distance in the current lane on the other side of the autonomous vehicle to perform the lane bias maneuver, instruct the autonomous vehicle to perform a minimal risk maneuver.

Clause 4. The system of Clause 3, wherein the minimal risk maneuver comprises:
slowing down the autonomous vehicle so that the autonomous vehicle does not drive adjacent to the vehicle; or
speeding up the autonomous vehicle so that the autonomous vehicle does not drive adjacent to the vehicle.

Clause 5. The system of Clause 3, wherein the at least one processor is further configured to at least determine that there is enough available distance on the current lane on the other side of the autonomous vehicle to perform the lane bias maneuver if the available distance on the current lane on the other side of the autonomous vehicle is more than or equal to the intruded distance on the current lane by the vehicle.

Clause 6. The system of Clause 3, wherein the at least one processor is further configured to at least determine that there is not enough available distance in the current lane on the other side of the autonomous vehicle to perform the lane bias maneuver if the available distance on the current lane on the other side of the autonomous vehicle is less than the intruded distance on the current lane by the vehicle.

Clause 7. The system of Clause 1, wherein the at least one processor is further configured to at least:
determine that the lateral distance between the autonomous vehicle and the vehicle is less than the threshold distance;
determine that there is not enough available distance in the current lane on the other side of the autonomous vehicle to perform the lane bias maneuver;
in response to determining that there is not enough available distance in the current lane on the other side of the autonomous vehicle to perform the lane bias maneuver:
determine whether there is another vehicle on an adjacent lane of the autonomous vehicle;
in response to determining that there is no other vehicle in the adjacent lane:
instruct the autonomous vehicle to perform the lane bias maneuver;
instruct the autonomous vehicle to temporarily drive into the adjacent lane until a distance between the autonomous vehicle and the vehicle is equal to the threshold distance; and
instruct the autonomous vehicle to drive back to the current lane when the autonomous vehicle is no longer adjacent to the vehicle.

Clause 8. A method comprising:
detecting a presence of a vehicle from sensor data captured by at least one sensor associated with an autonomous vehicle;
determining a lateral distance between the autonomous vehicle and the vehicle;
comparing the lateral distance between the autonomous vehicle and the vehicle with a threshold distance from the autonomous vehicle, wherein the autonomous vehicle is configured to travel along a road; and
determining, based at least in part upon the comparison between the lateral distance and the threshold distance, whether to instruct the autonomous vehicle to perform a lane bias maneuver,
wherein the lane bias maneuver comprises driving the autonomous vehicle off center in a current lane traveled by the autonomous vehicle toward an opposite direction with respect to the vehicle until the lateral distance between the autonomous vehicle and the vehicle is at least equal to the threshold distance.

Clause 9. The method of Clause 8, further comprising instructing the autonomous vehicle to perform the lane bias maneuver in response to determining that the lateral distance between the autonomous vehicle and the vehicle is less than the threshold distance, wherein the vehicle is detected on an adjacent lane on either side of the autonomous vehicle.

Clause 10. The method of Clause 8, further comprising:
determining whether the lane bias maneuver can be performed within a threshold time period; and
in response to determining that the lane bias maneuver can be performed within the threshold time period, instructing the autonomous vehicle to perform the lane bias maneuver, wherein the vehicle is detected in front and on an adjacent lane on either side of the autonomous vehicle.

Clause 11. The method of Clause 10, wherein determining whether the lane bias maneuver can be performed within the threshold time period comprises:
  determining a longitudinal distance between the autonomous vehicle and the vehicle;
  determining a first speed and a first position of the vehicle;
  determining a first trajectory of the vehicle based at least in part upon the first speed and the first position of the vehicle;
  determining a second speed and a second position of the autonomous vehicle;
  determining a second trajectory of the autonomous vehicle based at least in part upon the second speed and the second position of the autonomous vehicle if the lane bias maneuver is performed;
  predicting a future lateral distance between the autonomous vehicle and the vehicle based at least in part upon the first trajectory of the vehicle, the second trajectory of the vehicle, and the longitudinal distance between the autonomous vehicle and the vehicle;
  comparing the predicted lateral distance between the autonomous vehicle and the vehicle with the threshold distance; and
  performing the lane bias maneuver in response to determining that the predicted lateral distance between the autonomous vehicle and the vehicle will be at least equal to the threshold distance within the threshold time period,
  wherein the threshold time period is subject to at least one of traffic on the road, a speed of the autonomous vehicle, and a size of the vehicle.

Clause 12. The method of Clause 10, further comprising instructing the autonomous vehicle to perform a minimal risk maneuver in response to determining that the lane bias maneuver cannot be performed within the threshold time period, wherein the minimal risk maneuver comprises:
  slowing down the autonomous vehicle so that the autonomous vehicle does not drive adjacent to the vehicle; or
  speeding up the autonomous vehicle so that the autonomous vehicle does not drive adjacent to the vehicle.

Clause 13. The method of Clause 8, further comprising:
  determining a longitudinal distance between the autonomous vehicle and the vehicle, wherein the vehicle is stopped on a side of the road ahead of the autonomous vehicle;
  determining how much of the current lane is intruded by the vehicle;
  determining an available distance on the current lane on the other side of the autonomous vehicle compared to where the vehicle is detected;
  determining that there is enough available distance on the current lane on the other side of the current lane to perform the lane bias maneuver; and
  instructing the autonomous vehicle to perform the lane bias maneuver.

Clause 14. The method of Clause 8, further comprising determining not to instruct the autonomous vehicle to perform the lane bias maneuver in response to determining that a driving pattern of the vehicle indicates that a driving pattern prediction of the vehicle is less than a threshold percentage and that the driving pattern of the vehicle is highly unpredictable.

Clause 15. The method of Clause 14, wherein:
  the driving pattern of the vehicle is determined based at least in part upon a historical driving behavior associated with the vehicle; and
  the historical driving behavior indicates that the vehicle has been intruding into other lanes.

Clause 16. A non-transitory computer-readable medium storing instructions that when executed by one or more processors cause the one or more processors to:
  detect a presence of a vehicle from sensor data captured by at least one sensor associated with an autonomous vehicle;
  determine a lateral distance between the autonomous vehicle and the vehicle, wherein the autonomous vehicle is configured to travel along a road;
  compare the lateral distance between the autonomous vehicle and the vehicle with a threshold distance from the autonomous vehicle; and
  determine, based at least in part upon the comparison between the lateral distance and the threshold distance, whether to instruct the autonomous vehicle to perform a lane bias maneuver,
  wherein the lane bias maneuver comprises driving the autonomous vehicle off center in a current lane traveled by the autonomous vehicle toward an opposite direction with respect to the vehicle until the lateral distance between the autonomous vehicle and the vehicle is at least equal to the threshold distance.

Clause 17. The non-transitory computer-readable medium of Clause 16, wherein the instructions when executed by the one or more processors, further cause the one or more processors to maintain a consistent lane bias until the autonomous vehicle is no longer adjacent to the vehicle in response to performing the lane bias maneuver.

Clause 18. The non-transitory computer-readable medium of Clause 16, wherein:
  the autonomous vehicle comprises a semi-truck tractor unit attached to a trailer;
  the road is a curved road; and
  the instructions when executed by the one or more processors, further cause the one or more processors to:
    determine a road curvature associated with the road;
    determine a trailer angle between the semi-truck tractor unit and the trailer when the autonomous vehicle would reach the road curvature;
    calculate a total lane bias adjustment amount based at least in part upon the road curvature and the trailer angle; and
    instruct the autonomous vehicle to perform the lane bias maneuver based at least in part upon the total lane bias adjustment amount.

Clause 19. The non-transitory computer-readable medium of Clause 16, wherein the instructions when executed by the one or more processors, further cause the one or more processors to determine a classification of vehicles based at least in part upon a size of each vehicle, wherein determining whether to perform the lane bias maneuver is further based at least in part upon a particular class to which the vehicle belongs.

Clause 20. The non-transitory computer-readable medium of Clause 16, wherein the threshold distance is subject to at least one of traffic on the road, a speed of the autonomous vehicle, and a size of the vehicle.

Clause 21. A system comprising:
  a control device associated with an autonomous vehicle and comprising:
    a memory configured to store map data that comprises one or more roads ahead of the autonomous vehicle, wherein the autonomous vehicle comprises a semi-truck tractor unit attached to a trailer; and at least one processor, operably coupled with the memory, and configured to at least:
  determine that the autonomous vehicle is approaching a curved road based at least in part upon the map data;
  determine, based at least in part upon the map data, a road radius of the curved road;
  calculate, based at least in part upon the road radius, a first lane bias adjustment amount associated with a road curvature of the curved road;
  determine a trailer angle between the trailer and the semi-truck tractor unit;
  calculate, based at least in part upon the trailer angle, a second lane bias adjustment amount associated with the trailer angle;
  calculate a total lane bias adjustment amount by combining the first lane bias adjustment amount and the second lane bias adjustment amount; and
  instruct the autonomous vehicle to perform a lane bias maneuver, wherein the lane bias maneuver comprises driving the autonomous vehicle off center in a curved lane currently traveled by the autonomous vehicle based at least in part upon the total lane bias adjustment amount.

Clause 22. The system of Clause 21, wherein the autonomous vehicle comprises at least one sensor configured to capture sensor data that describes an environment around the autonomous vehicle; and
  wherein the at least one processor is further configured to at least:
    receive the sensor data from the at least one sensor; and
    determine a set of locations of lane markers on a road travelled by the autonomous vehicle from the sensor data,
    wherein to determine that the autonomous vehicle is approaching the curved road, the at least one processor is further configured to at least determine that the set of locations of lane markers follows a curved line.

Clause 23. The system of Clause 21, wherein to determine the road radius of the curved road, the at least one processor is further configured to at least:
  determine a virtual circle on the map data such that the curved road is a part of a circumference of the virtual circle; and
  calculate a distance between the center of the virtual circle and a point where the semi-truck tractor unit meets the trailer.

Clause 24. The system of Clause 21, wherein the first lane bias adjustment amount caused by the road curvature is calculated according to a first equation:

First lane bias adjustment amount =

$$\left(\text{road radius}^2 - \text{trailer length}^2\right)^{1/2} - \text{road radius}$$

wherein the trailer length is a length of the trailer.

Clause 25. The system of Clause 24, wherein the at least one processor is further configured to at least adjust a sign of the first lane bias adjustment amount based at least in part upon a direction of the road curvature and a direction of the first lane bias adjustment amount such that if the direction of the road curvature is to the left and the direction of the first lane bias adjustment amount is to the left, the first lane bias adjustment amount with the adjusted sign is calculated according to a second equation:

First lane bias adjustment amount with the adjusted sign =

$$\left(\left(\text{road radius}^2 - \text{trailer length}^2\right)^{\frac{1}{2}} - \text{road radius}\right) \times \text{sign}(-\text{road curvature})$$

wherein:
  if the direction of the road curvature is to the left, a sign associated with the road curvature is a positive sign;
  if the direction of the first lane bias adjustment amount is to the left, a sign associated with the first lane bias adjustment amount is a negative sign; and
  the sign (road curvature) indicates a sign associated with the direction of the road curvature.

Clause 26. The system of Clause 21, wherein the trailer angle is determined from sensor data received from a sensor associated with the autonomous vehicle.

Clause 27. The system of Clause 21, wherein in calculating the first lane bias adjustment amount, the trailer angle is represented to be zero.

Clause 28. A method comprising:
  determining that an autonomous vehicle is approaching a curved road based at least in part upon map data that comprises one or more roads ahead of the autonomous vehicle, wherein the autonomous vehicle comprises a semi-truck tractor unit attached to a trailer;
  determining, based at least in part upon the map data, a road radius of the curved road;
  calculating, based at least in part upon the road radius, a first lane bias adjustment amount associated with a road curvature of the curved road;
  determining a trailer angle between the trailer and the semi-truck tractor unit;
  calculating, based at least in part upon the trailer angle, a second lane bias adjustment amount associated with the trailer angle;
  calculating a total lane bias adjustment amount by combining the first lane bias adjustment amount and the second lane bias adjustment amount; and
  instructing the autonomous vehicle to perform a lane bias maneuver,
  wherein the lane bias maneuver comprises driving the autonomous vehicle off center in a curved lane currently traveled by the autonomous vehicle based at least in part upon the total lane bias adjustment amount.

Clause 29. The method of Clause 28, further comprising:
  receiving sensor data from at least one sensor associated with the autonomous vehicle;
  detecting a presence of a vehicle on a road from the sensor data;
  determining a lateral distance between the autonomous vehicle and the vehicle;
  comparing the lateral distance between the autonomous vehicle and the vehicle with a threshold distance;
  determining that the lateral distance is less than the threshold distance; and
  instructing the autonomous vehicle to perform the lane bias maneuver in response to determining that the lateral distance is less than the threshold distance, wherein the lane bias maneuver comprises driving the autonomous vehicle off center in a current lane traveled by the autonomous vehicle toward the opposite direction with respect to the vehicle until the lateral distance between the autonomous vehicle and the vehicle is at least equal to the threshold distance.

Clause 30. The method of Clause 29, further comprising:
determining a lane bias amount, wherein the lane bias amount is a distance that the autonomous vehicle moves off center until the lateral distance between the autonomous vehicle and the vehicle is at least equal to the threshold distance; and
combining the total lane bias adjustment amount to the lane bias amount.

Clause 31. The method of Clause 30, wherein the lane bias amount is determined based at least in part upon how much of the current lane is intruded by the vehicle and an available distance on the current lane on the other side of the autonomous vehicle compared to where the vehicle is detected.

Clause 32. The method of Clause 30, wherein when the vehicle is on a right side of the autonomous vehicle and the road curvature is to a left direction, the total lane bias adjustment amount is combined to the lane bias amount.

Clause 33. The method of Clause 30, wherein when the vehicle is on a left side of the autonomous vehicle and the road curvature is to a left direction, the total lane bias adjustment amount is not combined with the lane bias amount.

Clause 34. The method of Clause 28, wherein in calculating the second lane bias adjustment amount, a road travelled by the autonomous vehicle is represented to be a straight line.

Clause 35. The method of Clause 29, wherein the at least one sensor comprises at least one of a camera, a light detection and ranging (LiDAR) sensor, and an infrared sensor.

Clause 36. A non-transitory computer-readable medium storing instructions that when executed by one or more processors cause the one or more processors to:
determine that an autonomous vehicle is approaching a curved road based at least in part upon map data that comprises one or more roads ahead of the autonomous vehicle, wherein the autonomous vehicle comprises a semi-truck tractor unit attached to a trailer;
determine, based at least in part upon the map data, a road radius of the curved road;
calculate, based at least in part upon the road radius, a first lane bias adjustment amount associated with a road curvature of the curved road;
determine a trailer angle between the trailer and the semi-truck tractor unit;
calculate, based at least in part upon the trailer angle, a second lane bias adjustment amount associated with the trailer angle;
calculate a total lane bias adjustment amount by combining the first lane bias adjustment amount and the second lane bias adjustment amount; and
instruct the autonomous vehicle to perform a lane bias maneuver, wherein the lane bias maneuver comprises driving the autonomous vehicle off center in a curved lane currently traveled by the autonomous vehicle based at least in part upon the total lane bias adjustment amount.

Clause 37. The non-transitory computer-readable medium of Clause 36, wherein the second lane bias adjustment amount caused by the trailer angle is calculated according to a third equation:

Second lane bias adjustment amount=trailer length×sin(trailer angle)

wherein the trailer length is a length of the trailer.

Clause 38. The non-transitory computer-readable medium of Clause 36, wherein the instructions, when executed by the one or more processors, further cause the one or more processors to adjust a sign of the second lane bias adjustment amount based at least in part upon a direction of the trailer angle and a direction of the second lane bias adjustment amount such that if the direction of the trailer angle is to the left and the direction of the second lane bias adjustment amount is to the right, the second lane bias adjustment amount with the adjusted sign is calculated according to a fourth equation:

Second lane bias adjustment amount with the adjusted sign=−trailer length×sin(trailer angle)

wherein the trailer length is a length of the trailer.

Clause 39. The non-transitory computer-readable medium of Clause 36, wherein the instructions when executed by the one or more processors, further cause the one or more processors to:
determine that the autonomous vehicle is traveling along a straight road based at least in part upon the map data;
determine that the first lane bias adjustment amount is zero since the road radius is substantially large;
detect that wind is causing the trailer of the autonomous vehicle to divert from a straight line;
determine the trailer angle caused by the wind;
calculate the second lane bias adjustment amount caused by the trailer angle; and
determine that the total lane bias adjustment amount is equal to the second lane bias adjustment amount.

Clause 40. The non-transitory computer-readable medium of Clause 36, wherein:
when the trailer swings in a left direction, a sign associated with the trailer angle is negative; and
when the trailer swings in a right direction, the sign associated with the trailer angle is positive.

Clause 41. The system of any of Clauses 1-7, wherein the at least one processor is further configured to perform one or more operations of a method according to any of Clauses 8-15.

Clause 42. The system of any of Clauses 1-7, wherein the processor is further configured to perform one or more operations according to any of Clauses 16-20.

Clause 43. An apparatus comprising means for performing a method according to any of Clauses 8-15.

Clause 44. An apparatus comprising means for performing one or more instructions according to any of Clauses 16-20.

Clause 45. The non-transitory computer-readable medium of any of Clauses 16-20 storing instructions that when executed by the one or more processors further cause the one or more processors to perform one or more operations of a method according to any of Clauses 8-15 when run on a system.

Clause 46. The system of any of Clauses 21-27, wherein the at least one processor is further configured to perform one or more operations of a method according to any of Clauses 28-35.

Clause 47. The system of any of Clauses 21-27, wherein the processor is further configured to perform one or more operations according to any of Clauses 36-40.

Clause 48. An apparatus comprising means for performing a method according to any of Clauses 28-25.

Clause 49. An apparatus comprising means for performing one or more instructions according to any of Clauses 36-40.

Clause 50. The non-transitory computer-readable medium of any of Clauses 36-40 storing instructions that when executed by the one or more processors further cause the one or more processors to perform one or more operations of a method according to any of Clauses 28-35 when run on a system.

Clause 51. A system according to any of Clauses 1-7 and/or 21-27.

Clause 52. A method comprising operations according to any of Clauses 8-15 and/or 28-35.

Clause 53. An apparatus comprising means for performing a method according to any of Clauses 8-15 and/or 28-35.

Clause 54. An apparatus comprising means for performing one or more instructions according to any of Clauses 16-20 and/or 36-40.

Clause 55. The non-transitory computer-readable medium of any of Clauses 16-20 and/or 36-40 storing instructions that when executed by one or more processors further cause the one or more processors to perform one or more operations of a method according to any of Clauses 8-15 and/or 28-35 when run on a system.

The invention claimed is:

1. A system comprising:
a control device associated with an autonomous vehicle and comprising:
a memory configured to store map data that comprises one or more roads ahead of the autonomous vehicle, wherein the autonomous vehicle comprises a semi-truck tractor unit attached to a trailer; and
at least one processor, operably coupled with the memory, and configured to at least:
determine that the autonomous vehicle is approaching a curved road based at least in part upon the map data;
determine, based at least in part upon the map data, a road radius of the curved road;
calculate, based at least in part upon the road radius, a first lane bias adjustment amount associated with a road curvature of the curved road;
determine a trailer angle between the trailer and the semi-truck tractor unit;
calculate, based at least in part upon the trailer angle, a second lane bias adjustment amount associated with the trailer angle;
calculate a total lane bias adjustment amount by combining the first lane bias adjustment amount and the second lane bias adjustment amount; and
instruct the autonomous vehicle to perform a lane bias maneuver, wherein the lane bias maneuver comprises driving the autonomous vehicle off center in a curved lane currently traveled by the autonomous vehicle based at least in part upon the total lane bias adjustment amount;
wherein the at least one processor is further configured to:
receive sensor data from at least one sensor associated with the autonomous vehicle;
detect a presence of a vehicle on a road from the sensor data;
determine a lateral distance between the autonomous vehicle and the vehicle;
compare the lateral distance between the autonomous vehicle and the vehicle with a threshold distance;
determine that the lateral distance is less than the threshold distance; and
instruct the autonomous vehicle to perform the lane bias maneuver in response to determining that the lateral distance is less than the threshold distance, wherein the lane bias maneuver comprises driving the autonomous vehicle off center in a current lane traveled by the autonomous vehicle toward an opposite direction with respect to the vehicle until the lateral distance between the autonomous vehicle and the vehicle is at least equal to the threshold distance.

2. The system of claim 1, wherein the autonomous vehicle comprises at least one sensor configured to capture sensor data that describes an environment around the autonomous vehicle; and
wherein the at least one processor is further configured to at least:
receive the sensor data from the at least one sensor; and
determine a set of locations of lane markers on a road travelled by the autonomous vehicle from the sensor data,
wherein to determine that the autonomous vehicle is approaching the curved road, the at least one processor is further configured to at least determine that the set of locations of lane markers follows a curved line.

3. The system of claim 1, wherein to determine the road radius of the curved road, the at least one processor is further configured to at least:
determine a virtual circle on the map data such that the curved road is a part of a circumference of the virtual circle; and
calculate a distance between the center of the virtual circle and a point where the semi-truck tractor unit meets the trailer.

4. The system of claim 1, wherein the first lane bias adjustment amount caused by the road curvature is calculated according to a first equation:

First lane bias adjustment amount=(road radius$^2$−trailer length$^2$)$^{1/2}$−road radius wherein the trailer length is a length of the trailer.

5. The system of claim 4, wherein the at least one processor is further configured to at least adjust a sign of the first lane bias adjustment amount based at least in part upon a direction of the road curvature and a direction of the first lane bias adjustment amount such that if the direction of the road curvature is to a left and the direction of the first lane bias adjustment amount is to the left, the first lane bias adjustment amount with the adjusted sign is calculated according to a second equation:

$$\text{First lane bias adjustment amount with the adjusted sign} = \left(\left(\text{road radius}^2 - \text{trailer length}^2\right)^{\frac{1}{2}} - \text{road radius}\right) \times \text{sign}(-\text{road curvature})$$

wherein:
if the direction of the road curvature is to the left, a sign associated with the road curvature is a positive sign;
if the direction of the first lane bias adjustment amount is to the left, a sign associated with the first lane bias adjustment amount is a negative sign; and
the sign (road curvature) indicates a sign associated with the direction of the road curvature.

6. The system of claim 1, wherein the trailer angle is determined from sensor data received from a sensor associated with the autonomous vehicle.

7. The system of claim 1, wherein in calculating the first lane bias adjustment amount, the trailer angle is represented to be zero.

8. A method comprising:
  determining that an autonomous vehicle is approaching a curved road based at least in part upon map data that comprises one or more roads ahead of the autonomous vehicle, wherein the autonomous vehicle comprises a semi-truck tractor unit attached to a trailer;
  determining, based at least in part upon the map data, a road radius of the curved road;
  calculating, based at least in part upon the road radius, a first lane bias adjustment amount associated with a road curvature of the curved road;
  determining a trailer angle between the trailer and the semi-truck tractor unit;
  calculating, based at least in part upon the trailer angle, a second lane bias adjustment amount associated with the trailer angle;
  calculating a total lane bias adjustment amount by combining the first lane bias adjustment amount and the second lane bias adjustment amount; and
  instructing the autonomous vehicle to perform a lane bias maneuver,
  wherein the lane bias maneuver comprises driving the autonomous vehicle off center in a curved lane currently traveled by the autonomous vehicle based at least in part upon the total lane bias adjustment amount;
  wherein the method further comprises:
  receiving sensor data from at least one sensor associated with the autonomous vehicle;
  detecting a presence of a vehicle on a road from the sensor data;
  determining a lateral distance between the autonomous vehicle and the vehicle;
  comparing the lateral distance between the autonomous vehicle and the vehicle with a threshold distance;
  determining that the lateral distance is less than the threshold distance; and
  instructing the autonomous vehicle to perform the lane bias maneuver in response to determining that the lateral distance is less than the threshold distance, wherein the lane bias maneuver comprises driving the autonomous vehicle off center in a current lane traveled by the autonomous vehicle toward an opposite direction with respect to the vehicle until the lateral distance between the autonomous vehicle and the vehicle is at least equal to the threshold distance.

9. The method of claim 8, further comprising:
  determining a lane bias amount, wherein the lane bias amount is a distance that the autonomous vehicle moves off center until the lateral distance between the autonomous vehicle and the vehicle is at least equal to the threshold distance; and
  combining the total lane bias adjustment amount to the lane bias amount.

10. The method of claim 9, wherein the lane bias amount is determined based at least in part upon how much of the current lane is intruded by the vehicle and an available distance on the current lane on other side of the autonomous vehicle compared to where the vehicle is detected.

11. The method of claim 9, wherein when the vehicle is on a right side of the autonomous vehicle and the road curvature is to a left direction, the total lane bias adjustment amount is combined to the lane bias amount.

12. The method of claim 9, wherein when the vehicle is on a left side of the autonomous vehicle and the road curvature is to a left direction, the total lane bias adjustment amount is not combined with the lane bias amount.

13. The method of claim 8, wherein in calculating the second lane bias adjustment amount, a road travelled by the autonomous vehicle is represented to be a straight line.

14. The method of claim 8, wherein the at least one sensor comprises at least one of a camera, a light detection and ranging (LiDAR) sensor, and an infrared sensor.

15. A non-transitory computer-readable medium storing instructions that when executed by one or more processors cause the one or more processors to:
  determine that an autonomous vehicle is approaching a curved road based at least in part upon map data that comprises one or more roads ahead of the autonomous vehicle, wherein the autonomous vehicle comprises a semi-truck tractor unit attached to a trailer;
  determine, based at least in part upon the map data, a road radius of the curved road;
  calculate, based at least in part upon the road radius, a first lane bias adjustment amount associated with a road curvature of the curved road;
  determine a trailer angle between the trailer and the semi-truck tractor unit;
  calculate, based at least in part upon the trailer angle, a second lane bias adjustment amount associated with the trailer angle;
  calculate a total lane bias adjustment amount by combining the first lane bias adjustment amount and the second lane bias adjustment amount; and
  instruct the autonomous vehicle to perform a lane bias maneuver, wherein the lane bias maneuver comprises driving the autonomous vehicle off center in a curved lane currently traveled by the autonomous vehicle based at least in part upon the total lane bias adjustment amount;
  wherein the instructions, when executed by the one or more processors, further cause the one or more processors to:
  receive sensor data from at least one sensor associated with the autonomous vehicle;
  detect a presence of a vehicle on a road from the sensor data;
  determine a lateral distance between the autonomous vehicle and the vehicle;
  compare the lateral distance between the autonomous vehicle and the vehicle with a threshold distance;
  determine that the lateral distance is less than the threshold distance; and
  instruct the autonomous vehicle to perform the lane bias maneuver in response to determining that the lateral distance is less than the threshold distance, wherein the lane bias maneuver comprises driving the autonomous vehicle off center in a current lane traveled by the autonomous vehicle toward an opposite direction with respect to the vehicle until the lateral distance between the autonomous vehicle and the vehicle is at least equal to the threshold distance.

16. The non-transitory computer-readable medium of claim 15, wherein the second lane bias adjustment amount caused by the trailer angle is calculated according to a third equation:

$$\text{Second lane bias adjustment amount} = \text{trailer length} \times \sin(\text{trailer angle})$$

wherein the trailer length is a length of the trailer.

17. The non-transitory computer-readable medium of claim 15, wherein the instructions, when executed by the one or more processors, further cause the one or more processors to adjust a sign of the second lane bias adjustment amount based at least in part upon a direction of the trailer angle and a direction of the second lane bias adjustment amount such that if the direction of the trailer angle is to left and the direction of the second lane bias adjustment amount is to right, the second lane bias adjustment amount with the adjusted sign is calculated according to a fourth equation:

Second lane bias adjustment amount with the adjusted sign=−trailer length×sin(trailer angle)

wherein the trailer length is a length of the trailer.

18. The non-transitory computer-readable medium of claim 15, wherein the instructions when executed by the one or more processors, further cause the one or more processors to:
   determine that the autonomous vehicle is traveling along a straight road based at least in part upon the map data;
   determine that the first lane bias adjustment amount is zero since the road radius is substantially large;
   detect that wind is causing the trailer of the autonomous vehicle to divert from a straight line;
   determine the trailer angle caused by the wind;
   calculate the second lane bias adjustment amount caused by the trailer angle; and
   determine that the total lane bias adjustment amount is equal to the second lane bias adjustment amount.

19. The non-transitory computer-readable medium of claim 15, wherein:
   when the trailer swings in a left direction, a sign associated with the trailer angle is negative; and
   when the trailer swings in a right direction, the sign associated with the trailer angle is positive.

* * * * *